United States Patent
De Rosa et al.

(10) Patent No.: US 10,389,432 B2
(45) Date of Patent: Aug. 20, 2019

(54) MAINTAINING NETWORK CONNECTIVITY OF AERIAL DEVICES DURING UNMANNED FLIGHT

(71) Applicant: AT&T Intellectual Property I, L.P., Atlanta, GA (US)

(72) Inventors: Giuseppe De Rosa, Atlanta, GA (US); Mario Kosseifi, Roswell, GA (US); Ronald Kiefer, Louisville, KY (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 58 days.

(21) Appl. No.: 15/630,872

(22) Filed: Jun. 22, 2017

(65) Prior Publication Data

US 2018/0375568 A1 Dec. 27, 2018

(51) Int. Cl.
*G08G 5/00* (2006.01)
*B64C 39/02* (2006.01)
(Continued)

(52) U.S. Cl.
CPC ....... *H04B 7/18506* (2013.01); *B64C 39/024* (2013.01); *G08G 5/0039* (2013.01);
(Continued)

(58) Field of Classification Search
CPC .............. H04B 7/18506; B64C 39/024; G08G 5/0039; G08G 5/0069; H04W 72/04
(Continued)

(56) References Cited

U.S. PATENT DOCUMENTS 6,377,875 B1 * 4/2002 Schwaerzler ......... B64C 39/024
  244/1 R
7,737,878 B2 6/2010 Van Tooren et al.
(Continued)

FOREIGN PATENT DOCUMENTS

KR 20160128144 11/2016
KR 101712633 3/2017
(Continued)

OTHER PUBLICATIONS

Gharibi et al., "Internet of Drones", IEEE, Feb. 2, 2016, 15 pages.
(Continued)

*Primary Examiner* — Christopher R Crompton
(74) *Attorney, Agent, or Firm* — Haynes and Boone, LLP

(57) ABSTRACT

Example methods, apparatus, systems, and articles of manufacture (e.g., physical storage media) to facilitate maintaining network connectivity of aerial devices during unmanned flight are disclosed. An example method may include providing, to an access point of a radio access network (RAN) during flight of the unmanned aerial vehicle (UAV) on a flight route, channel allocation instructions for connecting the UAV to the radio access network via communication channels. The method may further include detecting an interference event associated with a portion of the flight route of the UAV during the flight. The method may further include adjusting, during the flight, the channel allocation instructions in response to detecting the interference event. The method may further include providing the adjusted channel allocation instructions to an access point of the radio access network during the flight.

20 Claims, 7 Drawing Sheets

(51) Int. Cl.
*H04B 7/185* (2006.01)
*H04W 72/04* (2009.01)

(52) U.S. Cl.
CPC .......... *G08G 5/0069* (2013.01); *H04W 72/04* (2013.01); *B64C 2201/146* (2013.01)

(58) Field of Classification Search
USPC ........................................................ 370/316
See application file for complete search history.

(56) References Cited

U.S. PATENT DOCUMENTS

| | | |
|---|---|---|
| 8,082,102 B2 | 12/2011 | Ravenscroft |
| 8,378,881 B2 | 2/2013 | LeMire et al. |
| 8,543,265 B2 | 9/2013 | Ekhaguere et al. |
| 8,626,361 B2 | 1/2014 | Gerlock |
| 8,781,650 B2 | 7/2014 | Downs |
| 8,798,922 B2 | 8/2014 | Tillotson et al. |
| 8,838,289 B2 | 9/2014 | Margolin |
| 8,977,481 B1 | 3/2015 | Downs |
| 9,274,521 B1 | 3/2016 | Stefani et al. |
| 9,454,157 B1 | 9/2016 | Hafeez et al. |
| 9,508,264 B2 | 11/2016 | Chan et al. |
| 9,540,104 B2 | 1/2017 | Kugelmass |
| 9,567,074 B2 | 2/2017 | Levien et al. |
| 9,569,972 B2 | 2/2017 | Pasko et al. |
| 9,601,022 B2 | 3/2017 | Taveira |
| 9,607,522 B2 | 3/2017 | Downey et al. |
| 2010/0121574 A1 | 5/2010 | Ariyur et al. |
| 2010/0332122 A1 | 12/2010 | Weichbrod et al. |
| 2012/0143482 A1 | 6/2012 | Goossen et al. |
| 2014/0018979 A1 | 1/2014 | Goossen et al. |
| 2016/0196750 A1 | 7/2016 | Collins |
| 2016/0292696 A1 | 10/2016 | Gong et al. |
| 2016/0300492 A1 | 10/2016 | Pasko et al. |
| 2016/0321930 A9 | 11/2016 | Yu et al. |
| 2016/0363929 A1 | 12/2016 | Clark et al. |
| 2016/0371985 A1 | 12/2016 | Kotecha |
| 2016/0371987 A1 | 12/2016 | Kotecha |
| 2017/0023939 A1 | 1/2017 | Krouse et al. |
| 2017/0025021 A1* | 1/2017 | Song .................. G08G 5/0034 |
| 2017/0057634 A1 | 3/2017 | Hunt et al. |
| 2017/0069214 A1 | 3/2017 | Dupray et al. |
| 2018/0166779 A1* | 6/2018 | Feria .................. H04B 7/18506 |

FOREIGN PATENT DOCUMENTS

| | | |
|---|---|---|
| WO | WO 2016/078093 | 5/2016 |
| WO | WO 2016/125161 | 8/2016 |
| WO | WO 2016/149513 | 9/2016 |
| WO | WO 2016/154943 | 10/2016 |
| WO | WO 2016/154947 | 10/2016 |
| WO | WO 2016/154948 | 10/2016 |
| WO | WO 2016/164892 | 10/2016 |
| WO | WO 2017/013417 | 1/2017 |
| WO | WO 2017/019595 | 2/2017 |
| WO | WO 2017/032906 | 3/2017 |
| WO | WO 2017/048363 | 3/2017 |

OTHER PUBLICATIONS

Lozano, Sharon, "First Steps Toward Drone Traffic Management", Nov. 19, 2015, 3 pages, NASA.

Jiang et al., "Unmanned Aircraft System Traffic Management: Concept of Operation and System Architecture", International Journal of Transportation Science and Technology, Jan. 2017, 13 pages.

Harris, Mark, "Nasa and Verizon Plan to Monitor US Drone Network from Phone Towers", Jun. 3, 2015, 4 pages, The Guardian.

Simonite, Tom, "Air Traffic Control for Drones", Oct. 17, 2014, 5 pages, MIT Technology Review.

Freeman, Mike, "Qualcomm, AT&T to Test Drones on Cellular Network", Sep. 7, 2016, 2 pages, The San Diego Union-Tribune.

Kenny, Caitlin Ailis, "Unmanned Aircraft System (UAS) Delegation of Separation in NextGen Airspace", May 2013, 130 pages, San Jose State University.

Jenkins, Nathan Alexander Lindo, "An Application of Aerial Drones in Zoning and Urban Land Use Planning in Canada", Ryerson University, 2015, 107 pages, Toronto, Canada.

Amin, Rasti J. Mohammed, "Using Associative Processing to Simplify Current Air Traffic Control", Dec. 2015, 61 pages, Kent State University.

* cited by examiner

MAINTAINING NETWORK CONNECTIVITY OF AERIAL DEVICES DURING UNMANNED FLIGHT

FIELD OF THE DISCLOSURE

This disclosure relates generally to aerial devices and, more particularly, to facilitating maintaining network connectivity of aerial devices during unmanned flight.

BACKGROUND

Unmanned aerial vehicles (UAVs), also referred to as drones or unmanned aerial systems (UASs), may be mobile platforms capable of acquiring (e.g., sensing) information, delivering goods, handling objects, and/or performing other actions, in many operating scenarios/applications. UAVs may be utilized to travel to remote locations that are inaccessible to manned vehicles, locations that are dangerous to humans, and/or any other locations more suited for unmanned vehicles than manned vehicles. Upon reaching such locations, drones can perform many actions, such as acquiring sensor data (e.g., audio, image, video, and/or other sensor data) at a target location, delivering goods (e.g., packages, medical supplies, food supplies, engineering materials, etc.) to the target location, handling objects (e.g., retrieving objects, operating equipment, repairing equipment, etc.) at the target location, and so forth. In the various operating scenarios/applications, the actions performed by the UAVs may require navigating the UAVs and maintaining network connectivity, such as connectivity to a cellular network.

SUMMARY

Using various embodiments, automated and adaptive flight routes and channel allocation instructions for connecting to a network during flight on the flight routes can maintain network connectivity of user equipment (UEs) at flight altitude, such as UAVs and/or other aerial devices in order to facilitate aerial navigation and aerial operation. In various aspects, the UEs can maintain connectivity to and communicate with base stations (e.g., also referred to as access points or cells) of a cellular network (e.g., a radio access network of the cellular network) while at flight altitude. The various embodiments may be used for UAVs and/or aerial devices of various sizes, including small UAVs (sUAVs) and larger UAVs, shapes, weight, speed, battery life, and/or other characteristics/traits, with appropriate consideration applied to these characteristics/traits when generating flight routes and channel allocation instructions. The UAVs and/or aerial devices may be with or without passengers.

Traditionally, cellular networks are optimized for devices connecting at a ground level, such as two meters or less off the ground, where typical devices (e.g., mobile phones) generally operate. In such cases, ground level objects (e.g., buildings and other manmade objects, trees and other natural obstacles, etc.) and geographic conditions (e.g., landforms including hills, mountains, etc. that may affect signal transmissions) may cause signal attenuation. Therefore, cellular base stations are generally optimized based on these factors for devices affected by such obstacles. However, UAVs at higher altitudes may instead encounter little to no ground level obstructions from ground level objects and may generate signal interference on the cellular network as well as receive interference from multiple base stations.

In various embodiments, for a given UAV, flight routes and channel allocation instructions may be based on flight plans provided by an operator of the UAV and geographic information associated with geographic regions that encompass starting points and destination points provided in the flight plans. The geographic information may include obstacle information, weather information, traffic management information (e.g., air traffic management information), emergency/critical broadcast information, and/or generally any other static and dynamic information associated with the geographic regions. For instance, the air traffic management information may include interference impact to the cellular network due to the cellular network (e.g., typically designed for devices connecting at a ground level) accommodating (e.g., providing network connectivity to) UAVs. In some aspects, the flight route and channel allocation instructions may be generated and managed by a mobile network provider of a cellular network. Adjustments to the flight routes and/or channel allocation instructions may be made in response to detected events and/or in response to requests from the UEs (e.g., adjustments to the flight plans). Detected events may be, or may include, detected changes in the geographic information, such as changes in an expected interference impact of accommodating UAVs and/or other aerial devices by a network (e.g., cellular network).

Flight routes and channel allocation instructions can be coordinated to allow air traffic to be better distributed throughout the airspace (e.g., to reduce traffic congestion and/or collisions) and/or to allow wireless traffic to be better distributed (e.g., to reduce overloading of some access points, underutilization of other access points, and interference impact above a threshold), thus facilitating more efficient use of the airspace and the network.

In one or more embodiments, a method to facilitate network connectivity of a UAV includes providing, to at least one access point of a radio access network during flight of the unmanned aerial vehicle on a flight route, channel allocation instructions for connecting the UAV to the radio access network via communication channels. The method further includes detecting an interference event associated with a portion of the flight route of the UAV during the flight; adjusting, during the flight, the channel allocation instructions in response to detecting the interference event; and providing the adjusted channel allocation instructions to an access point of the radio access network during the flight.

In one or more embodiments, a system includes one or more processors. The system further includes a non-transitory machine readable medium comprising instructions stored thereon, which when executed by the one or more processors, cause the one or more processors to perform operations including receiving flight plan information comprising a first point (e.g., a starting point) and a second point (e.g., a destination point). The operations further include generating, based at least on the flight plan information and interference information associated with a geographic region encompassing the first point and the second point, a flight route for an unmanned aerial vehicle and channel allocation instructions for connecting the unmanned aerial vehicle to a radio access network via communication channels; providing the flight route to the unmanned aerial vehicle; and providing, to at least one access point of the radio access network during flight of the unmanned aerial vehicle on the flight route, the channel allocation instructions. The operations further include adjusting, during the flight, the channel allocation instructions in response to an event associated with a portion of the flight route; and providing the adjusted channel allocation instructions to at least one access point of the radio access network during the flight.

In one or more embodiments, a tangible or non-transitory machine readable storage medium including machine readable instructions which, when executed, cause one or more processors of a device to perform operations including providing, to at least one access point of a radio access network, channel allocation instructions for connecting unmanned aerial vehicles to the radio access network via communication channels during flight of the unmanned aerial vehicles on a flight route, where the flight route includes a subset of a plurality of predefined air corridors. The operations further include detecting an interference event associated at least one of the subset of the plurality of predefined air corridors; determining whether an alternative flight route is available based at least on interference information associated with the plurality of predefined corridors; adjusting the channel allocation instructions in response to detecting the interference event when no alternative flight routes are determined to be available; and providing the adjusted channel allocation instructions to at least one access point of the radio access network.

The scope of the disclosure is defined by the claims, which are incorporated into this section by reference. A more complete understanding of embodiments of the disclosure will be afforded to those skilled in the art, as well as a realization of additional advantages thereof, by a consideration of the following detailed description of one or more embodiments. Reference will be made to the appended sheets of drawings that will first be described briefly.

Figure 1:
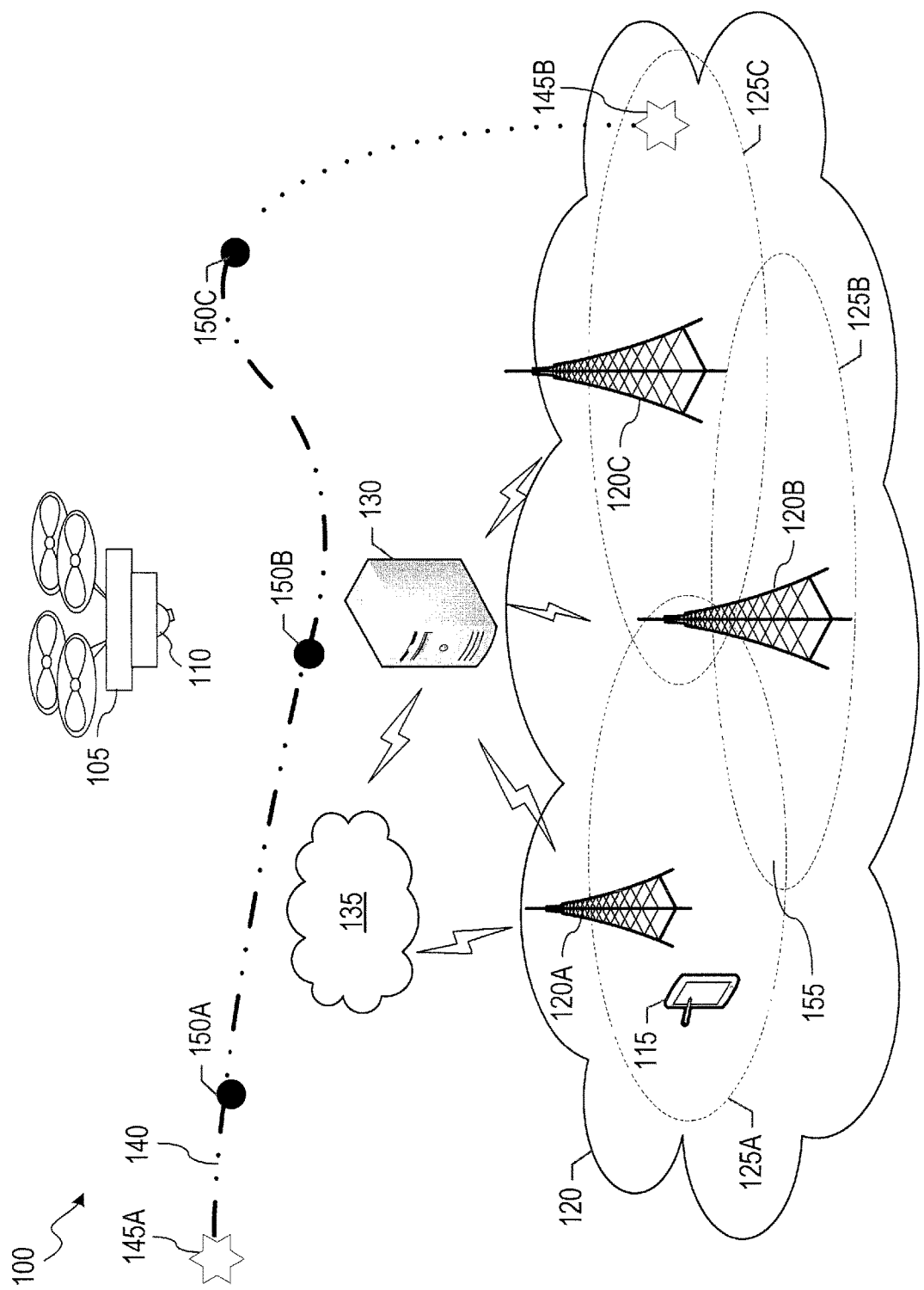
FIG. 1 illustrates an example network environment in which a system for maintaining network connectivity of aerial devices during unmanned flight may be implemented in accordance with one or more embodiments of the present disclosure.

Embodiments of the present disclosure and their advantages are best understood by referring to the detailed description that follows. It should be appreciated that like reference numerals are used to identify like elements illustrated in one or more of the figures, where showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided for facilitating maintaining network connectivity of UEs at flight altitude during unmanned flight, such as UAVs and/or other aerial devices. The UEs at flight altitude may fly on flight routes provided to the UEs and may be connected to a network (e.g., cellular network) via communication channels defined based at least on channel allocation instructions associated with the UEs. In an embodiment, for a given UE intended to be operated at flight altitude, the flight routes, channel allocation instructions, and other related information (e.g., start time, end time, speed of the flight) may be determined and generated based on flight plan information provided by an operator of the UE and geographic information. The geographic information may include obstacle information, weather information, traffic management information (e.g., air traffic management information), emergency/critical broadcast information, and/or generally any other static and dynamic information associated with the geographic regions.

Flight route, flight plan information, geographic information, and/or other information may be provided in three-dimensional space. For example, the flight route may be defined using a set of points, with each point associated with a longitude coordinate (or range of longitude coordinates), a latitude coordinate (or range of latitude coordinates), and an altitude coordinate (or range of altitude coordinates). The altitude coordinate may be a distance (e.g., height) from a reference sea level. Similarly, a position of a device (e.g., UE, access point) may be provided in three-dimensional space. In some cases, rather than the longitude, latitude, and/or altitude coordinates, other coordinate systems by which to identify positions of points in a three-dimensional space may be utilized. In this regard, in an aspect, a position may refer to a coordinate value or range of coordinate values in three-dimensional space. In some cases, the flight route may identify potential intermediary stops by the UEs, such as stops at UAV power docking stations to charge the UEs. The UEs may be provided with autonomy as to which (if any) of the potential intermediary stops to use.

In various embodiments, the traffic management information may include an interference impact to the network due to the network accommodating (e.g., providing network connectivity to) UAVs and/or other aerial devices. In this regard, for example, cellular networks are typically designed for devices connecting at a ground level. The interference impact may include uplink noise (e.g., also referred to as uplink interference noise) caused by UAVs flying in the airspace. Each access point of the network may be exposed to uplink interference noise due to any number of factors, including an orientation of its antenna(s), surrounding environment (e.g., presence or lack of presence of obstacles, weather conditions, etc.), and distance between the access point and UEs. The interference impact may be represented by (e.g., quantified by) an interference index (e.g., also referred to as an interference coefficient). The interference index may be associated with (e.g., assigned to) different portions of the airspace. The interference index of a portion of the airspace is indicative of an expected interference impact of a UE flying within the portion of the airspace to the network. In some cases, a higher interference index is associated with higher interference impact.

Adjustments to the flight routes and/or channel allocation instructions may be made in response to detected events and/or in response to requests from the UEs (e.g., adjustments to the flight plans). Detected events may be, or may include, detected changes in the geographic information, such as changes in an expected interference impact of accommodating UAVs and/or other aerial devices by the network (e.g., cellular network). An interference event may be detected when an interference impact is above a threshold. In some cases, the interference impact may be represented in terms of noise level (e.g., in dB) per physical resource block (PRB). By way of non-limiting example, in response to adjustments to the channel allocation instructions, a UAV may be migrated to a communication channel (e.g., also referred to as a radio channel) of a different frequency band, lower bit rate (e.g., video compression for video streaming applications), different type/category associated with a communication technology (e.g., 4G), and/or different communication technology (e.g., Universal Mobile Telecommunications Service (UMTS)). For example, a UAV may be migrated from communication over the network using a communication channel based on a 4G Long Term Evolution (LTE) to communication over the network using a communication channel based on 4G LTE Category-M1 (e.g., also referred to as LTE CAT-M or LTE-M).

The flight route and channel allocation instructions are generated and adjusted in compliance with Federal Aviation Administration (FAA) requirements and/or other requirements, such as temporary flight restrictions (e.g., temporary event such as wildfire or security-related event, stadiums/sporting events), restricted airspace, airport-related restrictions, local flight ordinances, and/or other restrictions. Other flight recommendations and/or requirements may be taken into consideration, such as any recommended or required minimum/maximum flight altitude and/or minimum/maximum flight speed.

In some embodiments, the airspace may be partitioned (e.g., divided, defined) into air corridors (e.g., also referred to as flight corridors, drone corridors, or drone air corridors) through which UAVs are allowed to fly. For example, the air corridors may be defined and adjusted by an authority such as the FAA. In such embodiments, the flight routes may be generated by connecting one or more air corridors. Different air corridors may be associated with different geographic information (e.g., obstacle information, weather information, traffic management information interference impact, etc.). An interference index or an interference index pattern (e.g., formed of multiple interference indices) can be assigned to each air corridor.

Thus, in various embodiments, the techniques facilitate sharing of airspace by UEs through the use of flight routes provided to the UEs and channel allocation instructions for connecting the UEs to a network (e.g., cellular network). The flight routes can be coordinated to reduce the possibility of collisions (e.g., between different UEs or between a UE and an obstacle), maintain wireless connection of the UEs to a network during flight of the UEs, and/or meet quality of service (QoS) parameters for various applications (e.g., ground-based and/or aerial-based missions). For example, QoS parameters for delivering packages may include reliability in meeting a deadline (e.g., time at which to reach the destination point) and/or maintaining the packages in good condition. In this regard, the flight routes and channel allocation instructions can be coordinated to allow air traffic to be better distributed throughout the airspace (e.g., to reduce traffic congestion and/or collisions) and/or to allow wireless traffic to be better distributed (e.g., to reduce overloading of some access points, underutilization of other access points, and interference impact due to UEs at flight altitude), thus facilitating more efficient use of the airspace and the network. By defining flight routes and channel allocation instructions, access points for the flight routes, start and/or end times of the flight routes, and/or other parameters associated with facilitating flight from a starting point to a destination point, a large density of UEs may simultaneously share (e.g., fly in) the airspace.

The implementation of the flight routes may be supplemented by onboard sensors of the UEs and/or broadcast messages provided by access points of the network. For instance, the onboard sensors of the UEs may be operated to maintain a minimum distance separation between the UEs and other UEs, and/or between the UEs and obstacles, e.g., such as minimum distance separation requirements or recommendations from FAA.

The network may include a wide area network (WAN), such as a cellular-based WAN. In some aspects, base stations of a cellular network are generally those base stations utilized with UEs at ground level or near ground level, such as vehicles (e.g., cars) and mobile phones operated at or near ground level. For example, position and orientation (e.g., tilt) of antennas of the base stations may be configured to provide higher signal strength for devices below these antennas. In this regard, the base stations may be designed with a main antenna pattern that primarily encompasses a ground region. Furthermore, at lower altitudes, obstructions such as buildings and trees may help prevent signals from multiple base stations from reaching the vehicles and devices at or near ground level with signal strengths that cause significant interference.

When radio modules, such as 3G, 4G, 4G LTE, 5G, other $3^{rd}$ Generation Partnership Project (3GPP)-based radio modules, and/or other radio modules, are placed at flight altitude, such as 300 feet or 400 feet, the line of sight propagation of signals from multiple base stations may be received by the radio modules and cause interference. The different antenna patterns (e.g., different vertical antenna patterns) of the base stations at different radio frequencies (e.g., in different frequency bands) and/or at different altitudes may cause degradation of communicated signals, including signals associated with application data and command/control functions. In addition, higher altitudes generally have fewer obstructions than at ground level, and thus more signals may reach the devices/vehicles at higher altitudes and cause interference relative to devices/vehicles at ground level. The aerial devices/vehicles (e.g., UAVs) may include antennas to receive radio signals from one or more base stations, such as a closest base station and/or a base station associated with higher signal strength. However, at altitudes above ground level, such as 20 feet or more above ground level, the aforementioned issues become apparent to radio signals received by the aerial devices/vehicles.

In some aspects, although the UEs are not communicating with base stations dedicated to aerial communication, the generation, management, and implementation of the flight routes may facilitate flight of the UEs and maintaining of cellular connectivity during flight of the UEs without disrupting service to UEs at ground level. In an aspect, flight of the UEs and maintaining of cellular connectivity may be facilitated with minimal or no changes to structural features, such as the housing, antennas, and/or other components, such that the use of the cellular network (e.g., the base stations) with the UEs at ground level are not affected by the UEs at flight altitude.

Although the description of the present disclosure is made with respect to cellular networks and UAVs, the techniques described herein may be applied to any wireless networks and any UEs navigating at flight altitudes and capable of establishing connectivity in such wireless networks. In some aspects, alternatively and/or in addition, the UAVs may wirelessly communicate with other devices using other wireless technology, such as Institute of Electrical and Electronics Engineers (IEEE) 802.11 standard, Bluetooth® standard, ZigBee® standard, and/or other wireless standards; infrared-based communications; optical-based communications; and/or other appropriate communication standards and/or protocols.

FIG. 1 illustrates an example network environment 100 in which a system for maintaining network connectivity of aerial devices during unmanned flight may be implemented in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. It is noted that sizes of various components and distances between these components are not drawn to scale in FIG. 1.

The network environment 100 includes a UAV 105, a user device 115, a radio access network (RAN) 120, an aerial traffic management system 130, and a core network 135. Base stations 120A-C of the RAN 120 are shown in FIG. 1, although the RAN 120 may include additional base stations. In other cases, a RAN may include fewer or more base stations. The UAV 105, user device 115, RAN 120 (e.g., base stations 120A-C), aerial traffic management system 130, and core network 135 may be in communication directly or indirectly. As used herein, the phrases "in communication," "communicatively connected," and variances thereof, encompass direct communication and/or indirect communication through one or more intermediary components and does not require direct physical (e.g., wired and/or wireless) communication and/or constant communication, but rather additionally includes selective communication at periodic or aperiodic intervals, as well as one-time events. In addition, communication with the RAN 120 may include communication with one or more of the base stations 120A-C and/or other components (e.g., base stations) of the RAN 120 not shown in FIG. 1. Similarly, communication with the core network 135 may include communication with one or more components of the core network 135, such as communication with a mobility management entity (MME) of the core network 135.

In an embodiment, the network environment 100 is implemented to form part of a cellular network, such as a 3G, 4G, 5G, and/or other 3GPP-based cellular network, and/or a cellular network based on other cellular standards. In this regard, as an example, the description of FIG. 1 is made herein with respect to the network environment 100 providing a cellular network. The cellular network may be provided by a mobile network operator. In FIG. 1, the cellular network includes the RAN 120, aerial traffic management system 130, and/or core network 135. In some cases, the aerial traffic management system 130 may be provided by another party. In some examples, the network environment 100 may be additionally or alternatively implemented to form part of a satellite communication network, microwave radio network, and/or other wireless networks.

The UAV 105 may include, may be a component of, and/or may be referred to as, a UE. The UAV 105 may include a flight control unit, communication unit, and payload unit. The flight control unit may be configured to facilitate aerial navigation of the UAV 105, e.g., take off, landing, and flight of the UAV 105. The flight control unit may include any appropriate avionics, control actuators, and/or other equipment, along with associated logic, circuitry, interfaces, memory, and/or code. Additionally, the flight control unit may include a controller that receives flight route information from one or more sources, including a memory and/or an external controller (e.g., set instructions from a service provider and/or in-flight navigation/instructions from an operator) that operates the UAV 105.

The communication unit may include one or more radio transceivers (e.g., antennas) along with associated logic, circuitry, interfaces, memory, and/or code that enable communications, e.g., with the user device 115, RAN 120 (e.g., one or more of the base stations 120A-C), aerial traffic management system 130, and/or core network 135 via wireless interfaces and using the radio transceivers. In FIG. 1, the radio transceivers of the UAV 105 include an antenna 110, which may be omnidirectional or directional. The antenna 110 may be utilized to radiate and/or receive power uniformly in all directions (e.g., omnidirectional antenna), or one or more desired directions (e.g., directional antenna) to allow better performance (e.g., higher signal strength) in the desired direction, such as through higher gain and directivity and reduced interference due to signals from sources deviating from the desired direction. In this regard, signal strength of command/control links and/or application data channels may be improved, and/or interference of signals from different base stations may be reduced through the use of a directional antenna. The antenna 110 may be contained within a housing of the UAV 105, or disposed (e.g., mounted) outside a housing of the UAV 105 as an attachable and/or removable antenna. In some cases, the antenna 110 may be movable along and/or rotatable about one, two, or three axes. In other cases, the antenna 110 may be fixed (e.g., not movable and not rotatable).

The UAV 105 may measure signal strength, signal diagnostics, and/or interferences of signals from the base stations via signals received by the antenna 110 and/or other antenna(s) (e.g., omnidirectional and/or directional antenna) of the UAV 105. The signal strength may be, or may be based on, measures such as received signal strength indicator (RSSI), reference signal received power (RSRP), reference signal received quality (RSRQ), signal-to-noise ratio (SNR), signal-to-interference-plus-noise ratio (SINR), and/or other measures. Such measures of signal strength may be computed by the UAV 105 on signals received from a serving base station of the UAV 105 and surrounding base stations of the serving base station, which may include base stations referenced as neighbor base stations of the serving base station. In an aspect, signal strength may be referred to as signal quality, signal level, or signal power. A higher signal strength is generally associated with better reception. In addition, the antenna 110 and/or other antenna(s) may be used to exchange messages with the RAN 120 (e.g., one or more of the base stations 120A-C) to analyze message reception, clarity, and/or other measurements, as well as detect issues with messaging due to interference.

In an embodiment, the communication unit may send and/or receive information over a cellular technology network (e.g., 3G, 4G, 5G, and/or other 3GPP-based cellular network), such as to and/or from the user device 115, one or more of the base stations 120A-C, and/or the aerial traffic management system 130. In some aspects, the UAV 105 may wirelessly communicate (e.g., via the antenna 110 and/or other antennas) with other devices using other wireless technology, such as IEEE 802.11 standard, Bluetooth® standard, ZigBee® standard, and/or other wireless standards; infrared-based communications; optical-based communications; and/or other appropriate communication standards and/or protocols. In some cases, the UAV 105 may communicate via the antenna 110 using LTE Category-M1 and/or other Internet of Things (IoT)-based communication protocols/technologies. In some cases, the UAV 105 may be configured to communicate with another device using a proprietary wireless communication protocol and interface.

In addition, the communication unit of the UAV 105 may include suitable logic, circuitry, interfaces, memory, and/or code that enable wired communications, e.g., with the user device 115, RAN 120, aerial traffic management system 130, and/or core network 135. In this regard, the UAV 105 may be configured to interface with a wired network, such as via an Ethernet interface, power-line modem, Digital Subscriber Line (DSL) modem, Public Switched Telephone Network (PSTN) modem, cable modem, and/or other appropriate components for wired communication. A wired link may be implemented with a power-line cable, coaxial cable, fiber-optic cable, or other cable or wires that support corresponding wired network technologies. For example, the UAV 105 may utilize wired connections when at or near ground level, such as a wired connection between the UAV 105 and user device 115 for facilitating testing and/or calibration/setup of the UAV 105.

The payload unit may be configured to implement features supported by the UAV 105 and facilitate implementation of such features. The payload unit may include any equipment and associated logic, circuitry, interfaces, memory, and/or code. The payload unit may include a global positioning system (GPS) that provides a current position of the UAV 105 (e.g., using three coordinates). The position information from the GPS, together with position information of devices in communication with the UAV 105, may allow the UAV 105 to direct a directional antenna to, or to a vicinity of, one or more of these devices. By facilitating establishing and maintaining of connections with higher signal strength, the UAV 105 may facilitate implementation of various features supported by the UAV 105.

Depending on an application(s) of the UAV 105, the payload unit may include one or more onboard sensors, which may be contained within a housing of the UAV 105 or mounted outside the housing of the UAV 105. Such applications of the UAV 105 may be, may include, or may be performed as a part of missions to be performed by the UAV 105. By way of non-limiting example, sensors may include environmental sensors, such as temperature sensors, rain sensors, pressure sensors, humidity sensors, fog sensors, gas sensors, etc., or combination thereof; object/obstacle detection sensors, such as radar sensors, proximity sensors, motion detectors, etc., or combination thereof; imaging sensors (e.g., cameras, video cameras); acoustic sensors, and/or other types of sensors, or combination thereof. Some sensors may be utilized to prevent collisions, and may include other processing features for a collision avoidance system. Alternatively or in addition, the payload unit may include tools, actuators, robotic manipulators, etc., capable of performing an action, such as touching, grasping, delivering, and/or measuring objects. For delivery applications, the payload unit may include the object to be delivered, e.g., the object may be secured within a housing of the UAV 105. The payload unit may also contain rechargeable power sources, such as a rechargeable solar battery and associated solar charging panel or photovoltaic charging source.

The user device 115 may be, and/or may include, a mobile phone, a personal digital assistant (PDA), a tablet device, a computer, or generally any device that is operable to communicate wirelessly (e.g., via cellular standards using antennas) with the UAV 105, RAN 120, aerial traffic management system 130, and/or core network 135. For example, the user device 115 may communicate wirelessly over the cellular network by using the base station 120A as its serving base station. In an aspect, the user device 115 may be a remote control used by an operator (e.g., a human) to provide commands to the UAV 105 when the UAV 105 is within line of sight of the user device 115. For example, the operator may issue commands via the user device 115 to instruct the UAV 105 to fly in certain directions and/or at certain speeds and/or to perform activities such as picking up or delivering an object. In an aspect, the line of sight of the user device 115 may refer to a coverage area or coverage volume within which signals transmitted by the user device 115 to the UAV 105 can be received by the UAV 105 with sufficient signal strength. In some cases, the sufficient signal strength may be a preset threshold level (e.g., SNR level), which may be set during a setup/calibration stage for associating the UAV 105 with the user device 115.

In an embodiment, the UAV 105 and the user device 115 may wirelessly communicate with each other using wireless standards; cellular standards, and/or other cellular standards; infrared-based communication; optical-based communications; and/or other appropriate communication standards and/or protocols. In some cases, the UAV 105 may communicate with the user device 115 using LTE Category-M1, other IoT-based communication protocols/technologies, and/or proprietary wireless communication protocol and interface. In some cases, the UAV 105 and the user device 115 may be configured to communicate over a wired link (e.g., through a network router, switch, hub, or other network device) for purposes of wired communication, e.g., such as during testing, setup, and/or calibration stages between the UAV 105 and the user device 115. The UAV 105 may be at or near ground level to receive a wired connection. The UAV 105 and the user device 115 may be configured to interface with a wired network, such as via an Ethernet interface, power-line modem, DSL modem, PSTN modem, cable modem, proprietary wired communication protocols, and/or other appropriate components for wired communication.

Although a single user device (e.g., the user device 115) is shown in FIG. 1, multiple user devices (e.g., multiple devices owned by or otherwise accessible to the same operator) may be utilized to communicate with the UAV 105. For example, the same operator may communicate with the UAV 105 using the user device 115 (e.g., a tablet device) and/or a mobile phone.

One or more of the base stations 120A-C of the RAN 120 may include, may be a component of, and/or may be referred to as, a cell, a Node B (NB), an Evolved Node B (eNodeB or eNB), or a Home eNB (HeNB). One or more of the base stations 120A-C include suitable logic, circuitry, interfaces, memory, and/or code that enable communications, e.g., with the user device 115, one of the other base stations 120A-C, the aerial traffic management system 130, and/or core network 135 via wireless interfaces and utilizing one or more radio transceivers (e.g., antennas). In an aspect, the base stations 120A-C may transmit (e.g., broadcast) messages that, if received and processed by the UAV 105, provide information to facilitate navigation of the UAV 105 in the airspace. In some cases, the messages transmitted by the base stations 120A-C may be based on information that the base stations 120A-C receive from the core network 135 and/or aerial traffic management system 130. In some cases, one or more of the base stations 120A-C may be mobile (e.g., mobile base stations at ground level, mobile base stations at flight altitudes, mobile naval-based base stations, etc.).

The base stations 120A-C may be macrocell base stations, microcell base stations, picocell base stations, femtocell base stations, and/or other cell sizes. For example, the macrocell base station may provide a coverage area over a radial range up to the tens or hundreds of kilometers, the picocell base station may provide coverage over a radial range in the hundreds of meters, and the femtocell base station may provide coverage over a radial range in the tens of meters. In FIG. 1, the base stations 120A, 120B, and 120C have nominal coverage area 125A, 125B, and 125C, respectively, at ground level or near ground level. The coverage area of a base station may be different in different environments, at different altitudes, at different times, and at different frequency bands. When altitudes are taken into consideration, the coverage area provided by the base stations 120A-C may more appropriately be referred to as a coverage volume, with different coverage areas at different altitudes. In an aspect, a coverage area of a base station may be larger at flight altitudes (e.g., 400 feet) than at lower altitudes such as ground level, due to fewer obstructions at flight altitudes for example. As used herein, the coverage area and coverage volume may be referred to more generally as a coverage region, where the region may be two-dimensional (e.g., coverage area) or three-dimensional (e.g., coverage volume).

The core network 135 may include components (e.g., authentication, authorization, and account (AAA) server, MME, etc.) for managing connections of ground-based UEs (e.g., the user device 115) and/or aerial-based UEs (e.g., the UAV 105) to the RAN 120, aerial traffic management system 130, core network 135, and/or other cellular networks or components thereof (e.g., base stations of other RANs), and process information communicated using these connections. For example, the core network 135 may include and/or may be in communication with, a mobile telephone switching office (MTSO). The core network 135 may include components, such as an MME and/or other components, for authenticating UEs to the cellular network (e.g., authenticating UEs to the RAN 120 and core network 135) and for operating in conjunction with the RAN 120 to determine radio resource management strategy to facilitate connectivity of UEs to the cellular network.

The core network 135 includes suitable logic, circuitry, interfaces, memory, and/or code that enable communications, e.g., with the RAN 120 (e.g., one or more of the base stations 120A-C), aerial traffic management system 130, and/or one or more UEs (e.g., the UAV 105, the user device 115), via wireless interfaces and utilize one or more radio transceivers. In some cases, the core network 135 or components thereof may enable communications with the RAN 120 and aerial traffic management system 130 via wired interfaces.

The aerial traffic management system 130 may facilitate flight of UAVs and/or other aerial devices at flight altitude and maintaining connectivity of such vehicles/devices to the cellular network (e.g., the RAN 120 and core network 135). The aerial traffic management system 130 includes suitable logic, circuitry, interfaces, memory, and/or code that enable communications, e.g., with the RAN 120 (e.g., one or more of the base stations 120A-C), core network 135 (e.g., MIME of the core network 135), and/or one or more UEs (e.g., the UAV 105, the user device 115), via wireless and/or wired interfaces and utilize one or more radio transceivers.

In some aspects, the aerial traffic management system 130 (or component(s) thereof) may be a part of the core network 135 that is dedicated to handling UAVs and/or other aerial devices (e.g., authentication, profile information access and/or storage, etc.). Alternatively and/or in addition, the aerial traffic management system 130 (or component(s) thereof) may be separate from the core network 135. For instance, the aerial traffic management system 130 may be provided by another party. In this regard, even when provided by different parties, the aerial traffic management system 130 may share information with the core network 135, and vice versa, to facilitate management of UEs associated with (e.g., connected to, provided connectivity by) the cellular network. For explanatory purposes, operations described as being performed by the aerial traffic management system 130 may be performed at least partially, performed alternatively, and/or performed in addition at the core network 135, and/or vice versa.

In an aspect, the core network 135 and/or aerial traffic management system 130 may be, may include, or may be a part of, a server or server farm that can generate and distribute information to the user device 115 and/or the RAN 120. In some cases, different components (e.g., devices) of the core network 135 and/or aerial traffic management system 130 may be distributed across different geographic locations and/or may manage UEs (e.g., ground-based, aerial-based) and base stations in different geographic locations.

The base stations 120A-C of the RAN 120 may be in communication with the core network 135 and/or the aerial traffic management system 130 through a backhaul network. A UE (e.g., the UAV 105, the user device 115) may communicate with the core network 135 and/or the aerial traffic management system 130 via a serving base station selected by the UE, and the core network 135 and/or the aerial traffic management system 130 may communicate with the UE via the UE's serving base station. The core network 135 and/or aerial traffic management system 130 may be in direct communication with one or more of the base stations 120A-C or in communication with one or more of the base stations 120A-C through one or more intermediary base stations.

In some aspects, the base stations 120A-C may individually store or otherwise have access to a neighbor list that includes neighboring relationships of a base station with other base stations. The neighbor list may be an automatic neighbor relation (ANR) table. In some cases, the neighbor relationships may be based on measurement reports from UEs (e.g., the UAV 105). The UEs may transmit (e.g., periodically, aperiodically) the measurement reports to their respective serving base stations. The serving base stations may transmit (e.g., periodically, aperiodically) the measurement reports and/or information related to (e.g., derived from) the measurement reports to the aerial traffic management system 130 and/or core network 135.

The measurement reports may include signal strengths (e.g., RSSI, RSRP, etc.) of signals from the base stations 120A-C that are received and measured by the UEs and/or information derived based on the signal strengths. For example, the UAV 105 may measure the signal strengths of signals received by the UAV 105 from the serving base station, neighbor base stations of the serving base station, and/or other base stations, and the UAV 105 may include the signal strengths in the measurement reports. In some cases, the measurement reports of a UE may include information pertaining to signal strength of downlink PRBs, and/or other signal measurements, of the UE's serving base station and neighbor base stations of the serving base station.

In some cases, the core network 135 and/or aerial traffic management system 130 may generate, store, maintain, and/or update the neighbor lists. For example, the neighbor list for the base station 120A may be generated by the core network 135 based on measurement reports provided by UEs to the base station 120A and relayed by the base station 120A to the core network 135. Alternatively or in addition, the core network 135 may generate the neighbor list based on signal strength statistics, such as RSRP or RSSI variances, average SNR, average SINR, and/or generally any other signal strength statistics computed based on one or more signals received and measured by the UEs. The statistics may be computed by the UEs, the base stations 120A-C, aerial traffic management system 130, and/or the core network 135.

If the base station 120A receives comparative signal strengths (e.g., on measurement reports) from the UAV 105 for the base stations 120A and 120B, the base station 120A, aerial traffic management system 130, and/or core network 135 may determine that the base stations 120A and 120B can be referenced as neighboring base stations on the neighbor list. In an aspect, multiple neighbor lists may be generated for each base station. For example, one neighbor list for the base station 120A may be generated based on measurement reports from UEs at ground level (or near ground level), whereas a different neighbor list may be generated based on measurement reports from UEs at flight altitudes (e.g., UAVs).

In some cases, a neighbor list may include position information (e.g., longitude, latitude, altitude) of each base station on the neighbor list and/or otherwise provide information indicative of the position information of each base station. The position information may allow the UAV 105 to point a directional antenna (e.g., if any) at its serving base station to allow improved reception and transmission of signals, and/or scan for possible serving base stations using a directional antenna. In some cases, the neighbor list may include other information (e.g., obstacle information, weather information, etc.) for each base station on the neighbor list.

In an embodiment, the aerial traffic management system 130 receives, stores, analyzes, and processes data indicative of impact of UAVs and/or other aerial devices on the cellular network (e.g., the RAN 120, aerial traffic management system 130, and/or core network 135) in different portions of the airspace. The impact may be referred to as an interference impact and is indicative of the effect of accommodating (e.g., expending resources on) the UAVs and/or other aerial devices at flight altitude by providing the UAVs and/or other aerial devices connectivity to the cellular network, which is generally designed for use by devices at ground level. Such interference data may be included in and/or derived from the measurement reports received from the UAVs and/or other aerial devices.

For flight of the UAV 105 within a portion of the airspace (e.g., air corridor or portion thereof), the interference impact associated with the UAV 105 may be based on measurement reports provided by the UAV 105 to its serving base station during flight within the portion of the airspace. The interference impact may be based on noise (e.g., uplink noise) experienced by base stations of the RAN 120 when a UE at flight altitude is flying in the airspace. By way of non-limiting example, the noise caused by the UAV 105 may be based on transmission power used by the UAV 105 for data transmissions to its current serving base station, received signal power of signals (e.g., RSRP and/or RSRQ values) received by the UAV 105 from the current serving base station, and received signal power of signals received by the UAV 105 from surrounding base stations associated with the current serving base station. In an aspect, the surrounding base stations may be, or may include, base stations designated as neighboring base stations of the current serving base station (e.g., on an ANR table) of the current serving base station). In some cases, the interference impact to the cellular network associated with (e.g., attributed to) a UE when the UE is connected to the cellular network via a serving base station may be utilized to determine neighbor base stations of the serving base station.

As an example, for the UAV 105, the aerial traffic management system 130 may determine interference impact based on information pertaining to uplink and downlink PRB signal quality, uplink and downlink PRB utilization, and/or other information of a serving base station of the UAV 105, the serving base station's neighbor base stations, and/or other base stations. The information may be measured by the UAV 105 and provided by the UAV 105 in the measurement reports. The UAV 105 may also identify (e.g., in the measurement reports) the location (e.g., longitude, latitude, altitude) and time at which the UAV 105 performed the measurements. Such information may be utilized with information in measurement reports from other UEs to determine the interference impact to the cellular network (e.g., to PRBs associated with the RAN 120) that can be attributed to (e.g., correlated to) the cellular network accommodating the UAV 105. The aerial traffic management system 130 may generate interference indices based on the information provided by the UAV 105 and other aerial devices in their respective measurement reports.

In an embodiment, the aerial traffic management system 130 may define portions of the airspace and determine an interference impact associated with accommodation of UEs by the cellular network in each portion of the airspace. In this case, for each portion of the airspace, the interference impact may be based on noise (e.g., uplink noise) experienced by surrounding base stations (e.g., neighbor base stations) of a serving base station of the RAN 120 when the UEs are connected to the serving base station while flying in the portion of the airspace. The interference impact may be represented in terms of noise level per PRB. In some aspects, in a specific portion of the airspace, the aerial traffic management system 130 may determine correlations between levels of uplink noise on a non-serving base station and associated cause (e.g., UAVs operating within the specific portion of the airspace) based on non-serving base station PRB noise level analysis and uplink PRB utilization of UEs flying in the specific portion of the airspace. Different portions of the airspace may experience different interference impact associated with accommodation of UEs operating in the portions of the airspace.

Thus, using various embodiments, the aerial traffic management system 130 may coordinate and monitor traffic associated with UEs flying in the airspace as well as uplink and downlink network traffic associated with servicing such UEs. In this regard, the aerial traffic management system 130 may facilitate accommodation of UEs at flight altitude in the cellular network (e.g., typically optimized for UEs connecting at ground level) while monitoring and controlling impact of such accommodation on UEs that are connecting to the cellular network at or near ground level. In some cases, connectivity to the cellular network and/or flight route generation/management may be provided to subscribed UEs only. In other cases, cellular connectivity and/or flight route generation may be provided to subscribed UEs as well as unsubscribed UEs (e.g., with an additional fee for unsubscribed UEs).

In various embodiments, the aerial traffic management system 130 may generate and coordinate flight routes of UAVs and/or other aerial devices to allow air traffic to be distributed at flight altitude (e.g., to reduce traffic congestion and/or collisions) and/or cellular traffic to be distributed (e.g., to reduce overloading of some base stations and underutilization of other base stations), thus facilitating more efficient use of the airspace and the cellular network. In some cases, the distribution of the cellular traffic may help monitor and control interference impact on the cellular network associated with the UAVs and/or other aerial devices in the airspace.

In addition, the aerial traffic management system 130 may generate communication channel allocation instructions (e.g., also referred to as radio channel allocation instructions, physical channel allocation instructions, or communication channel allocation instructions) and provide these instructions to the RAN 120. The instructions may also be referred to as options or guidelines. The channel allocation instructions may indicate one or more frequency bands, bit rate range (e.g., minimum and/or maximum allowed bit rate), a communication protocol, and/or type/category of LTE technology (e.g., LTE Category M) to be used by the RAN 120 to define a communication channel (e.g., physical communication channel) for the UAV 105 for connecting the UAV 105 to the cellular network.

The channel allocation instructions are used by the base stations 120A-C and/or any base stations of the RAN 120 to assign a communication channel with the UAV 105 when the UAV 105 selects a base station as its serving base station during flight on a flight route. For example, when the UAV 105 selects the base station 120A as its serving base station, the base station 120A may assign a communication channel to the UAV 105 based on radio resource management of the base station 120A within bounds identified by the aerial traffic management system 130 in the channel allocation instructions. In some aspects, different portions of the airspace may be associated with different channel allocation instructions, such as to account for differences in the distribution of available and/or utilized channel resources of the RAN 120 for connecting to UAVs flying in the different portions.

With reference to FIG. 1, flight beyond the line of sight of the UAV 105 may be facilitated through a pre-programmed flight route provided by the aerial traffic management system 130. A flight route 140 may be defined by a set of points, including a starting point 145A, destination point 145B, and points 150A-C labeled in FIG. 1, at which the UAV 105 is located, has been located, or is expected to be located. Each point may be associated with a set of three-dimensional coordinates (e.g., longitude or longitude range, latitude or latitude range, altitude or altitude range). For example, in delivery applications, the starting point 145A may be a warehouse at which the UAV 105 is provided with the payload (e.g., a package) to be delivered and the destination point 145B may be, for example, a customer's house, a post office or courier service office, or other destination from which the payload is to be routed to the customer.

The flight route 140 may include changes in latitude, longitude, and/or altitude throughout the route, as shown in FIG. 1 for example. In this regard, the aerial traffic management system 130 may determine that a shortest path between two base stations may not be feasible (e.g., due to temporary or permanent obstacles) and/or may not be associated with efficient air traffic (e.g., in presence of other UAVs). For instance, in some cases, while the shortest path may be implemented in geographic areas in which air traffic is sparse, the shortest path is not necessarily optimal for cases in which the air traffic is heavy with UAVs of different sizes, shapes, speeds, and/or applications. For example, the aerial traffic management system 130 may determine that a smoother (e.g., fewer turns and/or fewer changes in altitude) but lengthier route would be preferable to a shorter distance route for a UAV that is carrying a fragile payload (e.g., customer package, fragile equipment), e.g., to reduce probability of the payload being damaged. In some cases, the flight route may identify the positions of one or more charging stations that the UAV may utilize if needed.

At the points 145A and 150A, the UAV 105 may be within the line of sight of the user device 115. Within the line of sight, the UAV 105 may receive control signals directly from the user device 115. At the points 145B, 150B, and 150C, the UAV 105 may be beyond the line of sight of the user device 115. Different base stations may provide better signal strength at the different points 145A-B and 150A-C. For example, among the base stations 120A-C, the base station 120A may be generally associated with the highest signal strength at the point 145A, whereas the base station 120B may be generally associated with highest signal strength at the point 150B.

As shown in FIG. 1, the coverage areas 125A-C of the base stations 120A-C may overlap. The coverage areas 125A-C may represent the coverage areas of the base stations 120A-C at ground level. The UAV 105 may be within range of two or more of the base stations 120A-C. For example, the UAV 105 may be within range of the base stations 120A and 120B in an overlap region 155. Based on a specific position of the UAV 105, signal strength between the UAV 105 and the base station 120A may be different from (e.g., stronger than, weaker than) signal strength between the UAV 105 and the base station 120B. In some cases, the overlap in the coverage regions may be more pronounced at flight altitudes than at ground level, such as due to fewer obstructions, and the overlap may be associated with regions of higher interference impact to the cellular network.

During flight on the flight route, the UAV 105 may select a serving base station based on relative signal strengths of different base stations and generate measurement reports containing power measurements associated with the serving base station and/or other surround base stations (e.g., neighbor base stations of the serving base station). The UAV 105 communicates with its serving base station via a communication channel assigned to the UAV 105 by the serving base station. For example, between the points 145A and 150B, the UAV 105 may select the base station 120A as its serving base station and perform measurements (e.g., power measurements) on signals transmitted to and received from the base station 120A and base stations 120B-C by the UAV 105. In this example, the measurements associated with the base stations 120B-C may be indicative of the interference impact of the UAV 105 on the base stations 120B-C when the UAV 105 is connected to the base station 120A. The base station 120A, as the serving base station of the UAV 105, decodes signals received from the UAV 105, whereas any signals received by the base stations 120B-C from the UAV 105 is considered noise (e.g., also referred to as uplink interference noise or simply interference noise) to the base stations 120B-C. The UAV 105 may select other base stations as its serving base station during the flight (e.g., based on relative signal strengths associated with different base stations). For example, between the points 150B and 150C, the UAV 105 may select the base station 120C as its serving base station. A handover of the UAV 105 from the base station 120A to the base station 120C may occur at or around the position 150B.

The aerial traffic management system 130 may generate flight routes to be pre-programmed (e.g., preloaded) into UAVs (e.g., the UAV 105) and/or other aerial devices, such as the flight route 140 in FIG. 1, in response to requests for flight routes to be flown by the UAVs. The aerial traffic management system 130 may also generate channel allocation instructions associated with the flight routes. The aerial traffic management system 130 may generate a flight route and associated communication channel allocation instructions based on flight plan information provided by the operator(s) of the UAVs and geographic information associated with geographic regions encompassing the starting points and destination points. For example, the aerial traffic management system 130 may determine flight routes based at least in part on the interference impact of UAVs on different portions of the airspace.

In some cases, the aerial traffic management system 130 may adjust the flight routes and associated channel allocation instructions based on changes to the flight plan and/or geographic information. The adjusted flight routes may be sent to the UAVs prior to flight of the UAVs (e.g., if the UAVs have not started flight on the flight route) or during flight of the UAVs (e.g., if the UAVs have already started flight on the flight route). During flight of the UAVs on the flight route, the aerial traffic management system 130 may adjust and readjust the flight route and/or channel allocation instructions in real-time as appropriate based on any changes (e.g., updates) to the flight plan (e.g., from the operator of the UAV 105) and/or the geographic information. In this regard, the aerial traffic management system 130 may adjust the channel allocation instructions provided to the cellular network to reduce interference contributed (e.g., or reduce interference expected to be contributed) by the UAV 105 to the cellular network, e.g., when interference impact of the UAV 105 and/or other aerial devices (e.g., individually and/or collectively) is above a threshold. For example, when the UAV 105 is streaming high definition video (e.g., for real-time virtual sightseeing applications), the aerial traffic management system 130 may lower the bit rates allocatable by the RAN 120 to the UAV 105 in order to reduce interference impact associated with the UAV 105.

In some cases, the aerial traffic management system 130 may provide a start time, end time, and/or time duration within which the UAV 105 flies on the flight route. In some cases, such as when the starting point 145A and destination point 145B are within a sparsely populated region, the aerial traffic management system 130 might not specify the start time and/or end time. For example, in a region with little to no air traffic, the aerial traffic management system 130 may indicate that the UAV 105 may be flown at any time (e.g., aside from any regulations associated with when UAVs may and may not be flown in a given geographic region).

The operator(s) may transmit the flight plan information to the aerial traffic management system 130 using the UAV 105 and/or the user device 115. The flight plan information from the UAV 105 and/or the user device 115 may include the starting point 145A and the destination point 145B that the UAV 105 needs to traverse. The UAV 105 and/or user device 115 may provide other flight plan information to the aerial traffic management system 130 such as, by way of non-limiting example, a preferred departure time(s) (e.g., from the starting point), a preferred arrival time(s) (e.g., at the destination point), a preferred flight duration, characteristics/capabilities of the UAV 105 (e.g., size, shape, battery capacity, average flight speed, maximum flight speed, maximum flight altitude, wind resistance), and/or other characteristics associated with flight from the starting point 145A to the destination point 145B.

In some cases, the flight plan information may define a mission associated with the requested flight and possibly related information. The mission may include one or more actions to be performed by the UAV 105 at the starting point 145A, destination point 145B, and/or en route from the starting point 145A to the destination point 145B. The mission ends when the action(s) are successfully completed (e.g., the package reaches the destination point 145B) or the mission is aborted. Aborted missions can be redefined or resumed at a later time if appropriate. For a delivery application, the mission may include delivering a package from the starting point 145A to the destination point 145B. Information related to the mission may include importance of meeting a departure time and/or an arrival time, presence of fragile payload, expected cellular traffic associated with package delivery (e.g., sending messages to an intended recipient of the package prior to and/or upon leaving the package at the destination point 145B), and/or other information. For a flight test, the mission may include performing measurements on signals received at the starting point 145A, destination point 145B, and/or various other points along the flight route, and generating reports (e.g., measurement reports) based on the measurements.

The channel allocation instructions may be based at least on the mission to be performed. For example, when the mission is associated with streaming video, the channel allocation instructions may allow higher bit rates to be assigned to the UAV 105 when radio resources are available. In some embodiments, different portions of the airspace may be associated with different channel allocation instructions, such as to account for differences in the distribution of available and/or utilized channel resources of the RAN 120 for providing connectivity to UAVs flying in the different portions.

The aerial traffic management system 130 may also generate the flight route and channel allocation instructions for connecting to the cellular network during flight on the flight route based on geographic information. The geographic information may include position information, obstacle information, weather information, traffic management information, emergency/critical broadcast information, and/or generally any other static and dynamic information associated with associated geographic regions. In some cases, the aerial traffic management system 130 may receive or obtain the geographic information from one or more sources (e.g., sensors, meteorological services, information services) that provide such information to, or provide such information for access by, the core network 135 and/or aerial traffic management system 130.

The position information may be three-dimensional positions, including altitudes, associated with each associated geographic region, such as positions of the starting point 145A, destination point 145B, and base stations (e.g., the base stations 120A-C and/or other base stations) within the geographic region. In some cases, one or more of the base stations 120A-C may be mobile (e.g., mobile base stations at ground level, mobile base stations at flight altitudes, mobile naval-based base stations, etc.), in which case its position information is dynamic.

The obstacle information may identify buildings, bridges, trees, base stations, mountains, and/or other obstacles that may affect flight of the UAVs, and positions (e.g., in three-dimensions) associated with each obstacle. In some cases, the obstacle information may identify obstacles that may affect takeoff and landing of the UAVs. The weather information may identity weather of the geographic area, such as wind speed/direction, rain, fog, hail, etc. The emergency broadcast information may identify traffic incidences and/or no-fly zones (e.g., temporary no-fly zones due to these traffic incidences).

The traffic management information may include performance characteristics associated generally with the cellular network and more particularly with the base stations 120A-C and/or other base stations of the RAN 120. By way of non-limiting example, the performance characteristics may include accessibility (e.g., radio resource control (RRC) setup success rate), mobility (e.g., handover success rate), utilization/occupancy, interference impact of accommodating (e.g., providing cellular connectivity to) UAVs, and/or other characteristics. The traffic management information may include cellular traffic statistics associated with ground-based UEs and/or aerial-based UEs.

In some cases, the performance indicators may be, may include, or may be referred to as, key performance indicators (KPIs). Examples of KPIs may include those provided in the 3GPP standard, including accessibility, retainability, integrity, availability, and mobility. For example, the utilization/occupancy (also referred to as utilization rate or occupancy rate) associated with a base station may be, or may be indicative of, a ratio of an average amount of data traffic associated with the base station to a capacity of the base station (e.g., amount of data traffic that can be supported at any given time by the base station). The utilization/occupancy associated with the base station may be different for different times of day and/or different days of the week, may be different on holidays, etc. The flight routes and associated start/end times may be generated based at least in part on the utilization/occupancy information of different base stations, such as to better distribute data traffic among the base stations to reduce probability of overloading some base stations and underutilizing other base stations. The data traffic associated with UEs (e.g., different types of UEs) may be determined and taken into consideration when generating the flight plans. In this manner, efficiency of the cellular network may be improved.

In an aspect, the traffic management information may provide information indicative of signal strengths and/or interference impact at different frequency bands and/or at different positions (e.g., altitudes, longitudes, and/or latitudes). In this regard, the traffic management information may provide preferred channel characteristics (e.g., frequency bands, bit rates, etc.) at different altitudes.

In some embodiments, the aerial traffic management system 130 may be provided by a mobile network operator and may utilize traffic information, including air traffic information, associated with devices connecting to the cellular networks provided by the mobile network operator, as well as traffic information (e.g., air traffic information) not associated with cellular networks provided by the mobile network operator. In this regard, in some cases, in generating the flight plans by the mobile network operator, the aerial traffic management system 130 may determine air traffic information that is not associated with the mobile network operator. Air traffic information not associated with the mobile network operator may include air traffic information associated with other mobile network operators, air traffic information associated with non-network devices (e.g., UAVs used as emergency beacons), air traffic information associated with government agencies, and/or other information relating to air traffic not associated with the mobile network operator. In some cases, the aerial traffic management system 130 may receive air traffic information from one or more other mobile network operators, such as flight routes generated by other mobile network operators. In some cases, the aerial traffic management system 130 may receive air traffic information from another party, such as from local authorities that manage air traffic sensors and/or generate/distribute air traffic statistics, crowdsourcing (e.g., from users that provide air traffic information about particular locations and/or air traffic incidences), and/or other sources.

In some aspects, the core network 135 and/or the aerial traffic management system 130 may facilitate (e.g., coordinate) flight tests through various flight routes (e.g., defined by longitude, latitude, and altitude ranges) to collect geographic information along the flight routes. For example, the collected information may be used to determine signal interferences and/or problem spots in the cellular network. For the flight tests, the mobile network operator of the cellular network may deploy one or more UAVs whose missions are to fly on respective flight routes to gather signal strength and/or other signal diagnostics associated with different components of the cellular network, such as different base stations.

In an aspect, using the flight tests, the aerial traffic management system 130 may determine signal strength statistics at different positions (e.g., altitudes, longitudes, and/or latitudes) and/or different frequency bands based on the measurement reports generated by the UEs. In some cases, the aerial traffic management system 130 may determine signal strengths and/or interference impact at different frequency bands and/or at different positions.

In some cases, the aerial traffic management system 130 may assign an interference index to a portion of the airspace may be determined based on measurements gathered by the flight tests. The interference index may be based at least on uplink noise associated with (e.g., contributed by, caused by) the UAVs flying through the portion of the airspace. In some cases, the uplink noise may include the noise experienced by the serving base station of a UAV and/or surrounding base stations of the serving base station. The measurement reports may include information pertaining to, or information derivable into, noise levels experienced by the serving base station and/or surrounding base stations of the serving base station. The surrounding base stations may be neighbor base stations of the serving base station.

When generating and managing flight routes and/or channel allocation instructions for UAVs and/or other devices at flight altitude, the aerial traffic management system 130 complies with FAA requirements or recommendations, including temporary flight restrictions (e.g., temporary event such as wildfire or security-related event, stadiums/sporting events), restricted airspace, airport-related restrictions, local flight ordinances, and/or others. Other flight recommendations and/or requirements may be taken into consideration, such as any recommended or required minimum/maximum flight altitude and/or minimum/maximum flight speed. Similarly, the UAV 105 is operated to maintain a minimum distance separation between the UAV 105 and other UAVs, and/or between the UAV 105 and obstacles, e.g., such as minimum distance separation requirements or recommendations from the FAA.

In some embodiments, the airspace may be partitioned (e.g., divided, defined) into air corridors (e.g., also referred to as flight corridors, drone corridors, or drone air corridors), such as by an authority such as the FAA, through which UAVs are allowed to fly. Definitions of the air corridors may be adjusted by the authority. In such embodiments, the aerial traffic management system 130 may retrieve definitions of the air corridors (e.g., from a database provided by the FAA) and generate flight routes by selecting and connecting one or more air corridors. Different air corridors may be associated with different geographic information (e.g., obstacle information, weather information, traffic management information including interference impact, etc.).

Figure 2:
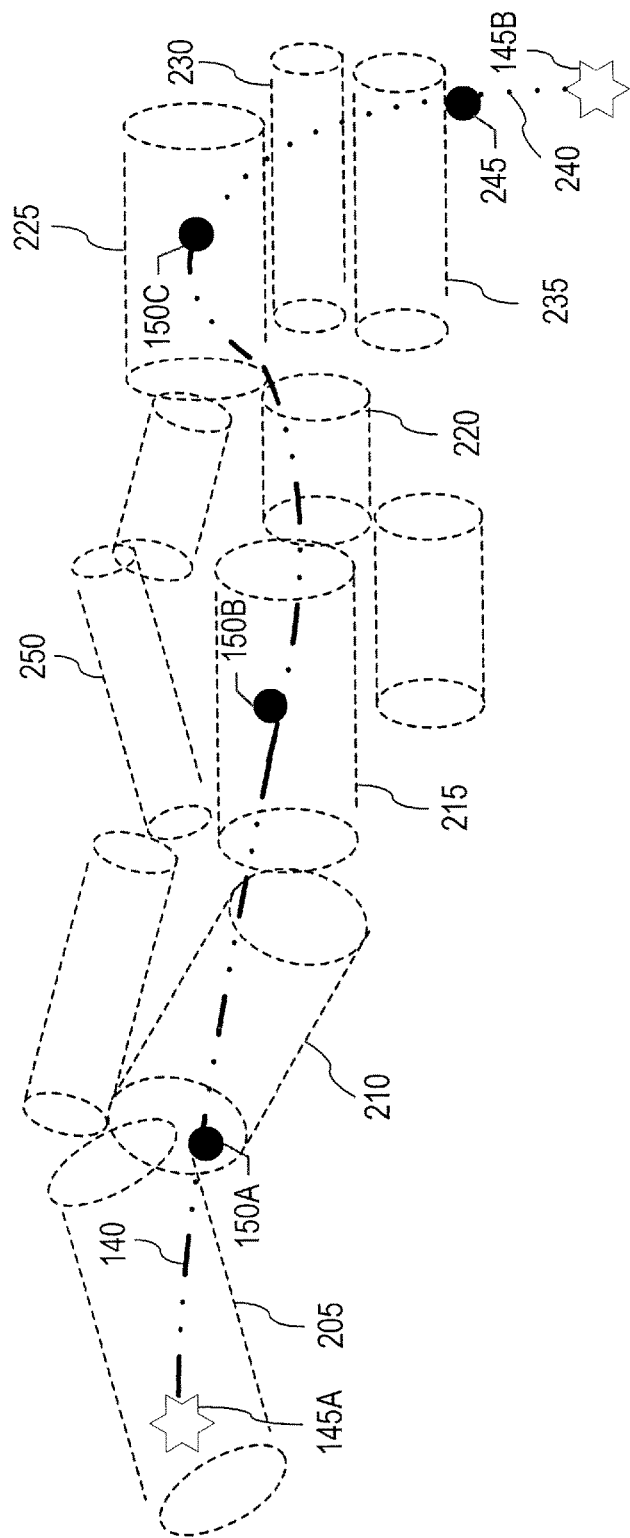
FIG. 2 illustrates an example of air corridors.

As an example, FIG. 2 illustrates an example of air corridors. The aerial traffic management system 130 may generate the flight route 140 by selecting from those air corridors shown in FIG. 2 and other air corridors not shown in FIG. 2. In FIG. 2, air corridors 205, 210, 215, 220, 225, 230, and 235 encompass the flight route 140. Examples of air corridors (e.g., 250) that are outside of the flight route 140 are also shown in FIG. 2. In some cases, the UAV 105 has autonomy on which positions within each air corridor 205, 210, 215, 220, 225, 230, and 235 to fly on the flight route 140, and may leverage its onboard sensors to navigate within each air corridor (e.g., to avoid collisions). In some cases, the aerial traffic management system 130 may specify a speed (e.g., average speed) at which the UAV 105 needs to traverse an air corridor and/or a time duration within which to completely traverse an air corridor (e.g., time from entering an air corridor to exiting the air corridor), e.g., for facilitating air traffic flow. Although the air corridors are depicted as cylindrically-shaped volumes of space, the air corridors may be other shapes.

As shown in FIG. 2, in an aspect, air corridors may be defined (e.g., by the FAA) for portions of the flight route 140 above a certain altitude whereas a remaining portion 240 of the flight route 140 between a position 245 and the destination point 145B is below this altitude. The UAV 105 may leverage its onboard sensors to navigate the remaining portion 240. In this regard, in some embodiments, a flight route provided by the aerial traffic management system 130 may include only portions encompassed by air corridors. For example, the aerial traffic management system 130 may define a flight route from the starting point 145A to the position 245 and provide such a flight route to the UAV 105. The aerial traffic management system 130 may instruct (e.g., implicitly or explicitly) the UAV 105 to autonomously fly to the destination point 145B from the position 245. In this regard, flight from the position 245 to the destination point 145B may be referred to as a "last mile." Similarly, in some cases, such as when a starting point is below a certain altitude, the UAV 105 may leverage its onboard sensors to navigate a "first mile" or distance to reach a beginning of a flight route.

In an embodiment, when the airspace is partitioned into air corridors, the aerial traffic management system 130 may associate each air corridor with one or more interference indices. For example, an air corridor that is smaller, has less traffic (e.g., aerial and/or ground traffic), and/or has uniform distribution of traffic may be associated with a single interference index. An air corridor that is larger, has more traffic, and/or has non-uniform distribution of traffic (e.g., air corridor spans different parts of a city) may be partitioned (e.g., by the aerial traffic management system 130) into different portions of the air corridor, with each portion associated with an interference index.

When an air corridor is associated with multiple interference indices, the interference indices may be collectively referred to as an interference index pattern of the air corridor. The interference index pattern may provide a map between a portion of the airspace and its corresponding interference index. The granularity (e.g., size of each portion of the air corridor) with which the aerial traffic management system 130 associates an interference index may be based on an average amount of network traffic (e.g., aerial- and/or ground-based network traffic) through the air corridor or portion thereof, average amount of physical traffic (e.g., air-based traffic, pedestrians, etc.) through the air corridor, under the air corridor, or portion thereof, and/or other considerations.

In an embodiment, the aerial traffic management system 130 may associate each air corridor with an interference index pattern based on the interference impact determined by the aerial traffic management system 130 for UAVs flying within the corridor. The interference index pattern for a corridor may include one or more interference indices at different positional ranges (e.g., longitude range, latitude range, altitude range) within the corridor, with each interference index being based on statistics (e.g., averages, variances, and/or others) derived from the measurement reports. The aerial traffic management system 130 may associate a different interference index to different portions of the corridor due to variability of the interference impact of UAVs at the different portions of the corridor. For example, the interference index pattern of a smaller corridor may include fewer interference indices than a larger corridor. In this regard, the interference index pattern may be indicative of an expected/estimated interference impact of a UAV on the radio access network when the UAV is flying through the associated air corridor. The partitioning of an air corridor (e.g., number, size, and/or shape of partitions) and/or an interference index or interference index pattern may be adjusted as measurement reports are received and processed and may change based on time of day, day of week, holidays, etc.

Figure 3:
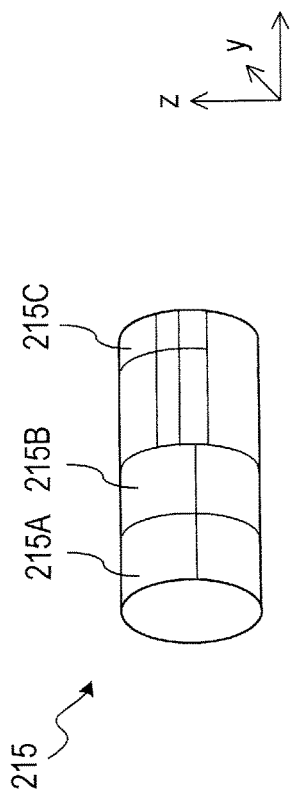
FIG. 3 illustrates an example of a partitioning of an air corridor in accordance with one or more embodiments of the present disclosure.

As an example, FIG. 3 illustrates an example of a partitioning of the air corridor 215 in accordance with one or more embodiments of the present disclosure. An x-axis may be indicative of an east-west direction (e.g., longitude direction). A y-axis may be indicative of a north-south direction (e.g., latitude direction). A z-axis of may be indicative of altitude. In an aspect, each partition (e.g., also referred to as portion) of the air corridor 215 is a volumetric space within the air corridor 215 and is defined by a range of x-coordinates, range of y-coordinates, and range of z-coordinates. As an example, partitions 215A, 215B, and 215C of the air corridor 215 are labeled. Each partition of the air corridor 215 may be associated with (e.g., assigned) an interference index based on a determined interference impact associated with the partition. The interference indices of the different partitions of the air corridor 215 collectively provide an interference index pattern of the air corridor 215.

As an example, each interference index may be one of three values represented as $n_1$, $n_2$, and $n_3$. A partition (e.g., 215A, 215B, 215C) of the air corridor 215 may be set to $n_1$ when the uplink noise associated with accommodation of a UAV at flight altitude (e.g., the UAV 105) is lower than a first threshold value, $n_3$ when the uplink noise is higher than a second threshold value that is higher than the first threshold value, and $n_2$ when the uplink noise is between the first and second threshold values. In this regard, $n_1$, $n_2$, and $n_3$ may be referred to as low interference impact, medium interference impact, and high interference impact, respectively. For example, the first and second threshold values may be 2 dB and 4 dB, respectively. In some cases, the values $n_1$, $n_2$, and $n_3$ may be assigned further based on a threshold percentage of base stations affected by the uplink noise. For example, a partition of the air corridor 215 may be set to $n_1$ when the uplink noise is lower than 2 dB for at least 80% of base stations that may be used as serving base stations for UAVs flying in the partition of the air corridor. The base stations that may be used as serving base stations may be determined (e.g., statistically determined) based on which base stations UAVs connect to, e.g., by UAVs implementing controlled test flights as well as UAVs flying as part of a mission (e.g., customer/consumer UAVs).

Although FIG. 3 provides an example in which the partitions of the air corridor are of different shapes and/or sizes, the shape and/or size of different partitions of an air corridor may be of identical. In addition, more, fewer, and/or different possible interference index values and associated threshold values may be utilized. In some cases, such as for small air corridors and/or air corridors with relatively little aerial traffic and/or cellular traffic, the air corridor is a single partition (e.g., not partitioned) and is associated with a single interference index. As indicated previously, in an aspect, the partitioning of an air corridor (e.g., number, size, and/or shape of partitions) and/or an interference index or interference index pattern may be adjusted as measurement reports are received and processed and may change based on time of day, day of week, holidays, etc. Similarly, the possible interference index values and associated threshold values may be adjusted as measurement reports are received and processed and may change based on time of day, day of week, holidays, etc. In some cases, the interference index values may be real numbers rather than integer numbers. For instance, the interference index values may be represented in terms of dB per PRB.

Figure 4:
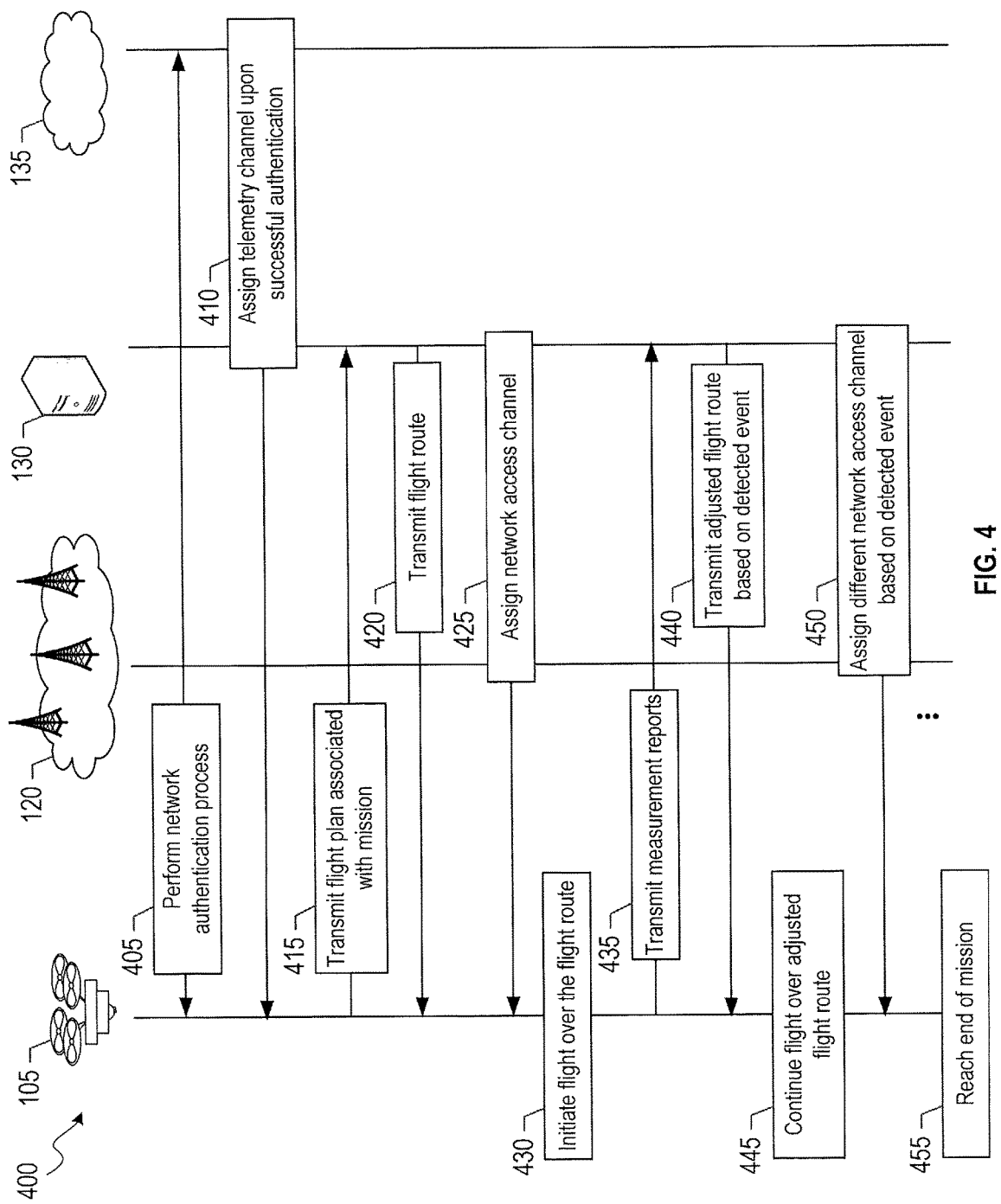
FIG. 4 illustrates a flow diagram of an example process for facilitating maintaining network connectivity of aerial devices during unmanned flight in accordance with one or more embodiments of the present disclosure.

FIG. 4 illustrates a flow diagram of an example process 400 for facilitating maintaining network connectivity of aerial devices during unmanned flight in accordance with one or more embodiments of the present disclosure. For explanatory purposes, the example process 400 is described herein with reference to the example network environment 100 of FIG. 1; however, the example process 400 is not limited to the example network environment 100 of FIG. 1. For example, the example process 400 may be with reference to one or more UEs (e.g., UAVs) and/or one or more base stations not shown in FIG. 1. Note that one or more operations may be combined, omitted, and/or performed in a different order as desired.

At block 405, the UAV 105 performs an authentication procedure with the core network 135 by transmitting authentication data associated with the UAV 105 to the core network 135. The authentication procedure may be initiated by the UAV 105 or the core network 135. In some cases, the UAV 105 may initiate the authentication procedure (e.g., based on user settings). For example, the UAV 105 may initiate the authentication procedure as part of a stored information cell selection or an initial cell selection (e.g., upon switching on the UAV 105 or upon the UAV 105 finding no suitable cell using stored information cell selection). Alternatively and/or in addition, in some cases, the core network 135 may initiate the authentication procedure by sending an authentication request to the UAV 105, e.g., in response to the UAV 105 attempting to connect to one of the base stations (e.g., one of the base stations 120A-C or other base station) of the RAN 120.

The authentication procedure may be conducted via messages communicated between the UAV 105 and the core network 135. In an aspect, in cellular communication protocols such as UMTS and LTE, the messages may include non-access stratum (NAS) messages communicated between the UAV 105 and an MME of the core network 135. In this aspect, the UAV 105 may include the authentication data in one or more NAS messages are transmitted to a base station (e.g., a base station selected by the UAV 105 as its serving base station) and forwarded by the base station to the MME.

In an embodiment, the core network 135 (e.g., the MME of the core network 135) and/or the aerial traffic management system 130 facilitates authentication of the UAV 105 to the core network 135 based at least on the authentication data provided by the UAV 105. In this regard, the core network 135 may communicate (e.g., exchange messages) with the aerial traffic management system 130 to authenticate the UAV 105 to the core network 135. For example, the core network 135 may store, maintain, and/or otherwise have access to profiles of subscribed users and/or UEs and may provide information associated with such profiles to the aerial traffic management system 130, and the aerial traffic management system 130 may coordinate accessibility of UAVs to the RAN 120 based on the information from the core network 135.

In an aspect, the authentication data may include an indication that the UAV 105 is a device operated at or to be operated at flight altitude. In some cases, the indication may be a previous identifier (e.g., unique identifier) associated by the cellular network with the UAV 105 that ties the UAV 105 to a subscribed UE profile, and the profile may indicate that the UAV 105 is a UAV. Alternatively and/or in addition, the indication may include an identifier (e.g., a binary value) that the UAV 105 may provide to identify itself as being a device operated at or to be operated at flight altitude.

In some cases, the core network 135 associates the UAV 105 with the aerial traffic management system 130 in cases that authentication data from the UAV 105 identifies the UAV 105 as a device operated at or to be operated at flight altitude. In this regard, the core network 135 at least partially offloads the UAV 105 to the aerial traffic management system 130, such that resources of the aerial traffic management system 130 are utilized to handle the UAV 105. Alternatively and/or in addition, in some cases, the core network 135 does not associate non-UAV UEs with the aerial traffic management system 130. In these cases, the aerial traffic management system 130 does not generally manage connectivity of non-UAV UEs to the cellular network.

Upon successful authentication of the UAV 105 to the core network 135, at block 410, the core network 135 and/or the aerial traffic management system 130 may assign a telemetry channel to the UAV 105. The telemetry channel may be a communication channel dedicated to be used by the UAV 105 to transmit (e.g., periodically and/or aperiodically) telemetry information associated with the UAV 105 and/or flight plan information. The telemetry channel may be for communication between the UAV 105 and one or both of the aerial traffic management system 130 or the core network 135. By way of non-limiting example, the telemetry information may include a current location (e.g., latitude, longitude, altitude) of the UAV 105, current heading, current speed, current battery level, ambient weather (e.g., temperature, rain, hail, snow) at the current location, and/or other information. Such information may be transmitted by the UAV 105 to the core network 135 and/or aerial traffic management system 130 via the telemetry channel when at ground level and during flight of the UAV 105. Such information may be to monitor the UAV 105 to determine that the UAV 105 stays on the flight route, control the UAV 105 when needed, help locate the UAV 105 if connectivity to the UAV 105 is lost, among others.

In some cases, the core network 135 and/or the aerial traffic management system 130 may indicate to the UAV 105 to interface with (e.g., communicate with) the aerial traffic management system 130 to facilitate flight of the UAV 105. In this regard, the UAV 105 may interface with the aerial traffic management system 130 to request a flight route and/or during flight of the UAV 105.

It is noted that generally any transmitted messages (e.g., NAS messages) from the UAV 105 to the aerial traffic management system 130 and/or the core network 135 are forwarded by the RAN 120 (e.g., a serving base station of the UAV 105) to the aerial traffic management system 130 and/or the core network 135. Similarly, any messages received by the UAV 105 from the aerial traffic management system 130 and/or the core network 135 may be forwarded to the UAV 105 by the RAN 120.

At block 415, the UAV 105 transmits a flight plan to the aerial traffic management system 130. The UAV 105 may transmit the flight plan using the telemetry channel assigned to the UAV 105. The flight plan may include information associated with (e.g., indicative of) a starting point (e.g., 145A), a destination point (e.g., 145B), and a mission. The mission may include one or more actions to be performed (e.g., successfully accomplished) by the UAV 105. For example, in a delivery application of the UAV 105, the mission may involve delivering a package from the starting point 145A to the destination point 145B, with the mission being completed when the package is delivered to the destination point 145B. In some cases, the UAV 105 may indicate frequency, bandwidth, bit rate, communication protocol, and/or other communication-related characteristics requested by the UAV 105 from the cellular network.

At block 420, the aerial traffic management system 130 transmits a flight route (e.g., 140) to the UAV 105. The flight route may be associated with a start time, an end time, and/or a time duration. The aerial traffic management system 130 may associate the flight route (e.g., the associated mission) with an identifier that the UAV 105 uses to identify the flight route or related information (e.g., the associated mission) to the cellular network. In this manner, actions (e.g., including flight) performed by the UAV 105 in relation to the flight route can be monitored. The aerial traffic management system 130 may generate the flight route based on the flight plan from the UAV 105 and geographic information associated with a geographic region that encompasses the starting point (e.g., 145A) and the destination point (e.g., 145B).

The geographic information may include interference information, such as interference index patterns associated with different portions of the airspace. For the flight plan from the UAV 105, the aerial traffic management system 130 may identify a geographic region (e.g., define boundaries of a geographic region) that encompasses the starting point 145A and the destination point 145B provided in the flight plan. The aerial traffic management system 130 may define the geographic region to narrow the geographic scope the aerial traffic management system 130 needs to consider when determining the flight routes, e.g., to conserve on computation time and resources.

In some embodiments, the flight route from the starting point to the destination point may be provided as a single airspace corridor or one or more connected airspace corridors. In some cases, the flight route may be provided finer granularity than the airspace corridors, such that the flight route defines positions/boundaries within each air corridor that the UAV 105 is to fly.

In some cases, the flight plan may be transmitted to the aerial traffic management system 130 by the user device 115 alternatively and/or in addition to the UAV 105 transmitting the flight plan. The flight plan may be sent by the UAV 105 and/or user device 115 to the core network 135 and/or aerial traffic management system 130. Similarly, the aerial traffic management system 130 may transmit the flight route and associated information in one or more messages to the UAV 105 and/or the user device 115 (e.g., for the user device 115 to relay to the UAV 105). As another example, the aerial traffic management system 130 may allow the UAV 105 and/or the user device 115 to retrieve the generated flight route information, e.g., stored locally at the aerial traffic management system 130 and/or at a remote memory (e.g., memory of a remote server) associated with the aerial traffic management system 130.

In some embodiments, the operator of the UAV 105 and/or user device 115 may generate a flight plan, via an interface, such as a user interface provided by a website and/or application program, and provide the generated the flight plan to the aerial traffic management system 130. The website and/or application program may be provided by one or more mobile network operators and/or another party to facilitate flight route generation and management. In response to receiving the operator's proposed flight plan, the aerial traffic management system 130 may generate a flight route and related information (e.g., start time, end time).

The interface may facilitate generation of the flight plan by the operator, and the operator may provide information on some or all fields (e.g., of a form) pertaining to the flight plan (e.g., starting point, destination point, departure and arrival time, actions to be performed on the flight). The aerial traffic management system 130 may identify any fields not filled in by the operator as the operator having no preference or attributing a lowest importance/priority to the field, such as when the operator does not specify a departure time and an arrival time. In some cases, the aerial traffic management system 130 may generate one or more potential flight routes based on information provided and information not provided by the operator and allow selection of a flight route by the operator.

At block 425, the RAN 120 and aerial traffic management system 130 assigns a communication channel to the UAV 105. In an embodiment, the aerial traffic management system 130 may provide the channel allocation instructions to a serving base station of the UAV 105, and the serving base station assigns the communication channel (e.g., physical radio channel) for connecting the UAV 105 to the RAN 120 in accordance with the radio channel allocation instructions. The channel allocation instructions may be generated for connecting the UAV 105 to the RAN 120 and maintaining connectivity during flight of the UAV 105. In this regard, in some cases, the channel allocation instructions need not be applied prior to the UAV 105 initiating flight over the flight route. As the UAV 105 is handed over between base stations (e.g., during flight of the UAV 105), each base station that is selected as a serving base station of the UAV 105 assigns a communication channel to the UAV 105 based on the channel allocation instructions. In some cases, blocks 420 and 425 may occur simultaneously or nearly simultaneously.

The channel allocation instructions are used by the base stations 120A-C and/or any base stations to establish a communication channel with the UAV 105 when the UAV 105 attempts to connect to these base stations en route to the destination point. The channel allocation instructions may indicate one or more frequency bands, bit rate range (e.g., minimum and/or maximum allowed bit rate), a communication protocol, and/or type/category of LTE technology to be used by the radio access network to define a communication channel for the UAV 105. For example, when the UAV 105 selects the base station 120A as its serving base station, the base station 120A may assign a communication channel to the UAV 105 based on radio resource management of the base station 120A within bounds identified by the aerial traffic management system 130 in the channel allocation instructions. In some embodiments, different portions of the airspace may be associated with different channel allocation instructions, such as to account for differences in the distribution of available and/or utilized channel resources of the RAN 120 for connecting to UAVs flying in the different portions.

In some cases, the aerial traffic management system 130 may determine whether the UAV 105 is qualified to perform the mission. As an example, the UAV 105 may need to be able to fly at a certain speed to satisfy an expected flight time. As another example, the aerial traffic management system 130 may determine whether the UAV 105 is certified (e.g., by an appropriate authority) to perform the mission. Certain missions may be regulated. For example, video streaming missions may need to abide by regulations, such as operating in specific frequency bands, using an antenna having certain characteristics (e.g., antenna that meets a minimum antenna efficiency requirement), etc. When the UAV 105 is determined not to be qualified (e.g., certified) for the mission, the aerial traffic management system 130 may transmit instructions to the operator (e.g., via the UAV 105 and/or the user device 115) to redefine the flight plan (e.g., the mission) or abort the flight plan. The communication channel assigned at block 425 may be used to perform actions associated with the mission during flight on the flight route. The communication channel is separate from the telemetry channel, which is dedicated to be used by the UAV 105 to transmit telemetry information associated with the UAV 105 during flight on the flight route and receive adjustments to the flight route if adjustments are needed.

The UAV 105 receives and loads the flight route. In this regard, the flight route may be referred to as a pre-programmed flight route of the UAV 105. In some cases, the UAV 105 may transmit a message to acknowledge the flight route received from the aerial traffic management system 130. At block 430, the UAV 105 initiates flight from the starting point to the destination point in accordance with the flight route. At block 435, the UAV 105 transmits measurement reports to a serving base station of the UAV 105 during flight over the flight route. Such measurement reports may be transmitted periodically or aperiodically. For example, with reference to FIG. 1, the UAV 105 may select a different base station for different portions of the flight route (e.g., based on respective signal strength of different base stations). In some cases, the measurement reports and/or information derived from the measurement reports (e.g., by the serving base station that receives the measurement reports) may be transmitted by the serving base station to the core network 135 and/or aerial traffic management system 130. The measurement reports and/or information derived therefrom may be analyzed and utilized to update the geographic information, adjust the existing flight route of the UAV 105 and/or existing flight routes of other UAVs as appropriate based on the updated geographic information, and generate new flight routes based on the updated geographic information.

At block 440, the aerial traffic management system 130 transmits (e.g., via the telemetry channel) an adjusted flight route based on a detected event. In this regard, the aerial traffic management system 130 may detect the event based on information received by the aerial traffic management system 130 from various sources (e.g., weather channels, law enforcement authorities, emergency broadcasts, crowd-sourcing from ground- and/or aerial-based UEs). In this regard, at least a portion of the flight route provided to the UAV 105 at block 420 is adjusted. In an embodiment, when the flight route transmitted at block 420 is defined using a set of air corridors, the adjusted flight route may include a different set of air corridors (e.g., at least one air corridor of the adjusted flight route is different from the pre-adjusted flight route) on which the UAV 105 is to be flown. In some cases, the detected event may be associated with an air corridor currently being navigated by the UAV 105. In some cases, the UAV 105 may be within an air corridor associated with the detected event, in which case the UAV 105 may need to maneuver out of the air corridor and into an air corridor identified in the adjusted flight route. In other cases, the adjustment may be for an air corridor not yet reached by the UAV 105.

At block 445, the UAV 105 continues flight in accordance with the adjusted flight route. In this regard, the UAV 105 is rerouted with regard to at least a portion of the flight route provided at block 420. The UAV 105 may transmit a message to acknowledge the adjusted flight route received from the aerial traffic management system 130.

At block 450, the RAN 120 and aerial traffic management system 130 assign a different communication channel based on a detected event. The aerial traffic management system 130 may adjust radio channel allocation instructions based on the detected event. The adjustment to the radio channel allocation instructions and communication channel may be referred to as a communication channel modification. The adjusted radio channel allocation instructions may include an adjustment to one or more of a frequency band allocatable to the UAV 105, a bit rate allocatable to the UAV 105, or a communication protocol for the UAV 105. For example, the adjustment of the communication protocol may be to migrate the UAV 105 from 4G LTE communication protocol to 4G LTE-M communication protocol (e.g., generally associated with lower bit rate than 4G LTE), to migrate the UAV 105 from 4G LTE communication protocol to UMTS, or other adjustment.

In an embodiment, when the UAV 105 is already flying on a portion of the flight route associated with the detected event, the aerial traffic management system 130 may provide the adjusted radio channel allocation instructions to a serving base station of the UAV 105, and the serving base station assigns the communication channel (e.g., physical communication channel) for connecting the UAV 105 to the cellular network in accordance with the adjusted channel allocation instructions. When the detected event is associated with a portion of the flight route to be flown on by the UAV 105, the aerial traffic management system 130 may provide the adjusted channel allocation instructions to a base station when the UAV 105 selects the base station as its serving base station.

In some cases, the adjusted radio channel allocation instructions may be generated for connecting the UAV 105 to the cellular network for a remaining portion of the flight route, absent detection of any additional events that cause further adjustments to the radio channel allocation instructions. In other cases, the adjusted radio channel allocation instructions may be generated for connecting the UAV 105 to the RAN 120 during flight of the UAV 105 within a portion of the flight route identified by the aerial traffic management system 130. For example, the detected event may be an interference event associated with an air corridor being traversed or to be traversed by the UAV 105, and the adjusted radio channel allocation instructions may be used to assign a physical communication channel to the UAV 105 during flight in this air corridor. In this example, the handover may be from a communication channel provided by a serving base station to a different communication channel provided by the same serving base station. Outside of this air corridor, the pre-adjusted channel allocation instructions and/or other channel allocation instructions specified by the aerial traffic management system 130 may be utilized by the RAN 120 to assign a communication channel to the UAV 105.

In some cases, the aerial traffic management system 130 may migrate the UAV 105 or cause the UAV 105 to be migrated off of the cellular network and onto a different technology (e.g., other cellular technology or non-cellular technology). In such cases, the aerial traffic management system 130 determines that the cellular network (e.g., the RAN 120 and/or core network 135) is unable to accommodate the UAV 105.

At block 455, the UAV 105 reaches an end of the mission. If the mission is successful, the UAV 105 has reached the end of the flight route and performed the actions associated with the mission. If the mission is unsuccessful, the UAV 105 prematurely ends (e.g., aborts) the mission.

The ellipses between block 450 and 455 may indicate additional or no adjustments to the flight route and/or assigned communication channel prior to the UAV 105 reaching the destination point 145B. In some cases, once the UAV 105 completes the flight route (e.g., reaches the destination point 145B), communication channel allocation instructions associated the flight route need not be utilized. Although FIG. 4 illustrates an example in which a detected event at block 440 causes adjustment of the flight route and a detected event at block 450 causes assignment of a different communication channel, other flight routes of UAVs may be associated with fewer, more, and/or different detected events and/or associated adjustments during flight over the flight routes.

In some cases, the authentication procedure may include multiple parts/steps. For example, a first part of the authentication procedure may be based on messages (e.g., NAS messages) between a UE (e.g., the UAV 105) and the core network 135. In this first part of the authentication procedure, the core network 135 may determine whether or not the UE is a device operated at or to be operated at flight altitude (e.g., a UAV or other aerial device). For example, the UE may include an indication that the UE is a UAV. If the UE is identified as a UAV, the core network 135 may offload the UE to the aerial traffic management system 130 to proceed to a second part of the authentication procedure. In this second part, the UE may indicate its capabilities, including flight capabilities (e.g., speed, availability and/or directionality of antenna(s), etc.). A multi-step authentication procedure may be utilized to improve efficiency of accommodating UAVs and/or other aerial devices in the airspace by allowing the core network 135 to determine whether a UE is a UAV (or other aerial device) and offload processing of UAVs to the aerial traffic management system 130, such that minimal processing of the core network 135 is diverted away from ground-based UEs due to UAVs.

In one or more embodiments, the aerial traffic management system 130 may adjust the flight route (e.g., at block 440) and/or assigned physical communication channel (e.g., at block 450) based on (e.g., in response to) detected events. In an aspect, events may be, or may include, dynamic condition/variable changes associated with at least a portion of a flight route currently being flown by the UAV 105. Such changes may be changes in the geographic information (e.g., obstacle information, weather information, emergency/critical broadcast information, etc.) associated with at least a portion of the flight route. The flight route may be defined using predefined air corridors (e.g., provided by an authority such as the FAA), although in other embodiments the flight route is defined using volumetric portions of airspace without using predefined air corridors. In this regard, an event may be, or may include, dynamic condition/variable changes associated with an air corridor(s), such as, by way of non-limiting example, cellular network congestion or outage, cellular network interference, traffic congestion within and/or beneath the air corridor(s), changes in atmospheric conditions, and/or generally other obstacles or changes in conditions (e.g., relative to when the pre-adjusted flight route was generated by the aerial traffic management system 130).

The aerial traffic management system 130 may detect an event based on information received (e.g., in real-time) from various sources including, by way of non-limiting example, weather channels, law enforcement authorities, emergency broadcasts, crowdsourcing from ground- and/or aerial-based UEs, RAN 120, and/or core network 135. As an example, the aerial traffic management system 130 may detect an outage of a particular base station of the RAN 120 when the aerial traffic management system 130 does not receive any messages from the base station for at least a threshold amount of time (e.g., the base station has been silent for over the threshold amount of time) and/or when the aerial traffic management system 130 receives information indicative of the outage from one or more other sources (e.g., other base stations, measurement reports, accident report indicating base station has been knocked over in an accident). As another example, the aerial traffic management system 130 may detect congestion of a particular base station of the RAN 120 when the aerial traffic management system 130 receives an indication of congestion of the base station from the base station itself and/or one or more other sources (e.g., other base stations, measurement reports). For example, the base station may be determined to be congested when occupancy of the base station is above a threshold (e.g., set by the aerial traffic management system 130). In this example, remaining resources of the base station may be reserved for UEs at or near ground level.

As another example, the aerial traffic management system 130 may detect unexpected crowd aggregation at altitudes below the altitudes associated with a flight corridor. Such crowd aggregation may be due to, for example, concerts, fires, storms, accidents, and/or generally any situation or event unknown to the aerial traffic management system 130 prior to detection of the unexpected crowd aggregation by the aerial traffic management system 130. For example, when the flight route is formed of one or more connected air corridors, the detected event may be a crowd aggregation at or near ground level in an area under an air corridor. The aggregation may be due to a sudden change in weather conditions (e.g., flash flood) that the aerial traffic management system 130 unable to account for or otherwise did not account for when the flight route was generated, and may affect (e.g., reduce) the number of UAVs that may fly in the air corridors above the aggregation (e.g., due at least to safety concerns for the crowd) and may resources available for the RAN 120 to accommodate connectivity to UAVs (e.g., due to resources being used by devices associated with the crowd).

The aerial traffic management system 130 may detect an interference event associated with the cellular network (e.g., the RAN 120) when the aerial traffic management system 130 receives information indicative of interference impact on base stations due to UAVs flying in the airspace. The interference event may be based on the interference index or interference index pattern associated with different portions of the airspace. In some cases, the interference impact may be represented in terms of dB per PRB. The interference event may be detected when the interference impact is above a threshold.

For example, in a case that portions of the airspace are associated with (e.g., assigned, categorized into, quantized into) one of interference indices $n_1$ (e.g., low interference impact), $n_2$ (e.g., medium interference impact), or $n_3$ (e.g., high interference impact). In some cases, whether an interference event is detected may be based on the flight plan associated with the UAV 105. For example, if the mission of the UAV 105 involves low bandwidth activities, the aerial traffic management system 130 may determine that an interference event is detected in a particular portion of the airspace when the particular portion is associated with an interference index of $n_3$. As another example, if the mission of the UAV 105 is highly resource intensive (e.g., high-definition video streaming), an interference event is detected in a particular portion of the airspace when the particular portion is associated with an interference index of $n_2$ or $n_3$. Accommodating the UAV 105 in portions of the airspace associated with an interference index of $n_1$ may allow mitigation of interference effect due to accommodating the UAV 105 while providing a higher probability of maintaining a QoS provided by the cellular network to the UAV 105. In this regard, as indicated previously, the interference index associated with each portion of the airspace is indicative of an expected interference impact caused by accommodating UAVs and/or other aerial devices by the cellular network, in which actions intended to be performed by the UEs at flight altitude (e.g., as specified in the flight plan) are taken into consideration when determining interference impact and what constitutes an interference event.

In an embodiment, the aerial traffic management system 130 may associate an interference index pattern with each air corridor. In this embodiment, the aerial traffic management system 130 may determine statistics (e.g., average, variance, and/or others) based on the interference index pattern and determine flight routes based on the determined statistics. For example, when an interference index is quantified, the aerial traffic management system 130 may detect an interference effect based on an average and/or variance of the interference indices associated with each air corridor.

Figure 5:
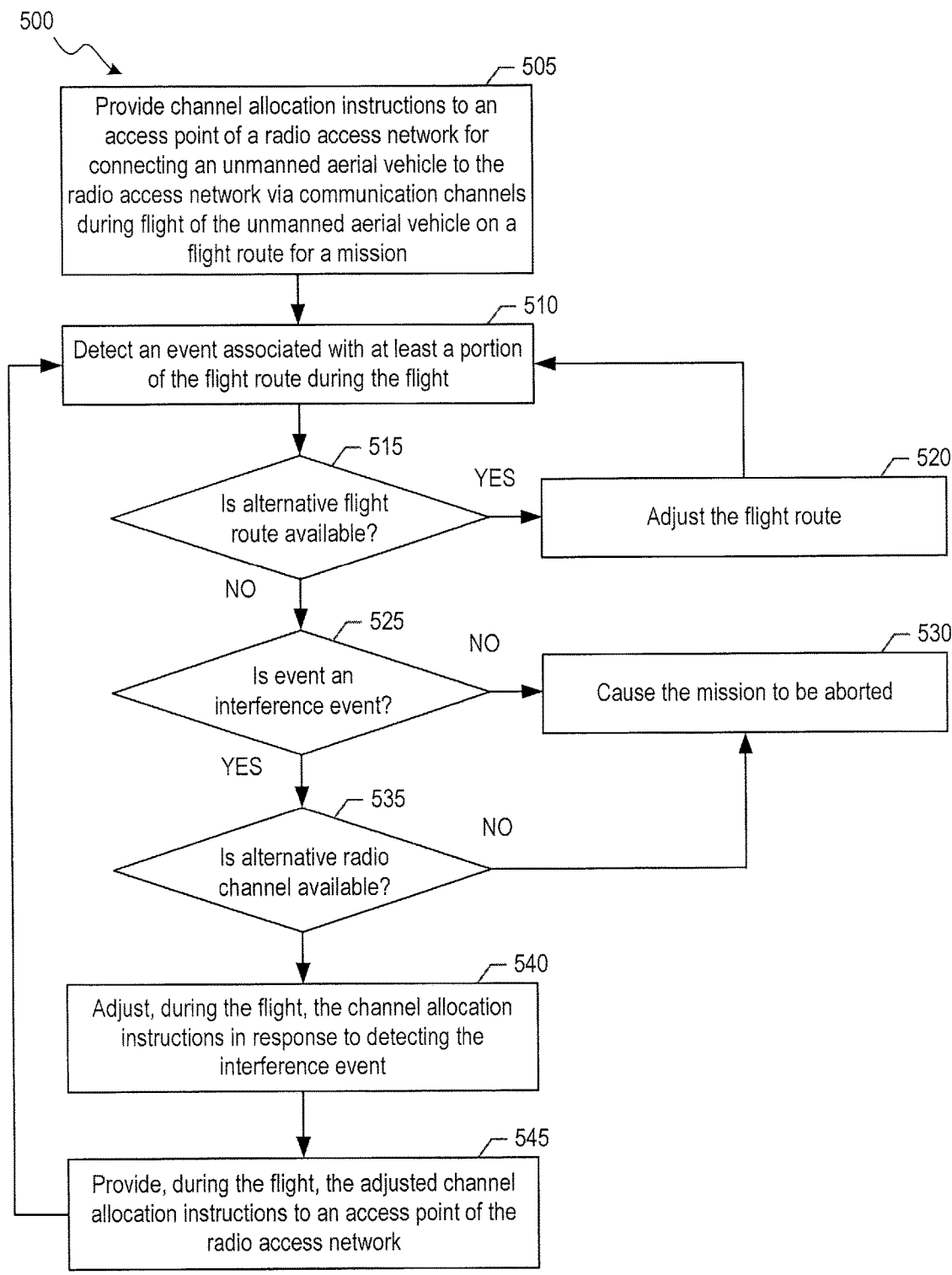
FIG. 5 illustrates a flow diagram of another example process for facilitating maintaining network connectivity of aerial devices during unmanned flight in accordance with one or more embodiments of the present disclosure.

FIG. 5 illustrates a flow diagram of an example process 500 for facilitating maintaining network connectivity of aerial devices during unmanned flight in accordance with one or more embodiments of the present disclosure. For explanatory purposes, the example process 500 is described herein with reference to the example network environment 100 of FIG. 1; however, the example process 500 is not limited to the example network environment 100 of FIG. 1. For example, the example process 500 may be with reference to one or more UEs (e.g., UAVs) and/or one or more base stations not shown in FIG. 1. In this regard, for explanatory purposes, in an aspect, the example process 500 is performed by the aerial traffic management system 130. Note that one or more operations may be combined, omitted, and/or performed in a different order as desired.

At block 505, the aerial traffic management system 130 provides, to at least one base station (e.g., one of the base stations 120A-C or other base station) of the RAN 120, channel allocation instructions for connecting the UAV 105 to the RAN 120 during flight of the UAV 105 on a flight route (e.g., 140). In some aspects, the aerial traffic management system 130 may provide (e.g., transmit) the channel allocation instructions to a current serving base station of the UAV 105. In this regard, at the starting point 145A of the flight route 140, the aerial traffic management system 130 may provide the channel allocation instructions to a base station selected by the UAV 105 as its serving base station. The serving base station connects to the UAV 105 via a physical communication channel defined by the serving base station based on the channel allocation instructions. For example, when the UAV 105 selects the base station 120A as its serving base station, the base station 120A may assign a communication channel to the UAV 105 based on radio resource management of the base station 120A within bounds (e.g., frequency bands, bit rate range, communication protocol, etc.) specified by the aerial traffic management system 130 in the channel allocation instructions. In some embodiments, different portions of the airspace may be associated with different channel allocation instructions, such as to account for differences in the distribution of available and/or utilized channel resources of the RAN 120 for connecting to UAVs flying in the different portions.

When the UAV 105 is handed over from a first base station (e.g., the base station 120A) to a second base station (e.g., the base station 120B) during the flight of the UAV 105, the aerial traffic management system 130 may provide the channel allocation instructions to the second base station and/or the second base station can be provided with the channel allocation instructions (e.g., from the first base station) as part of the handover procedure. The second base station may connect to the UAV 105 via a physical communication channel defined by the second base station based on the channel allocation instructions. In some cases, the physical communication channel assigned by the second base station may have properties (e.g., frequency, bit rate) that the same or similar as the properties of the physical communication channel assigned by the first base station.

In some cases, the aerial traffic management system 130 may indicate that channel allocation instructions apply to the UAV 105 when (e.g., only when) the UAV 105 is flying on the flight route. In this regard, during flight on the flight route, the UAV 105 is configured to be connected to the radio access network via physical communication channels defined based at least on the channel allocation instructions. Before the UAV 105 starts the flight route (e.g., prior to flight of the UAV 105 or prior to reaching a starting point of the flight route), the RAN 120 can, but need not, define the communication channels for connecting the UAV 105 to the RAN 120 in accordance with the channel allocation instructions. A flight start of the UAV 105 associated with a flight route (e.g., 140) may refer to the UAV 105 starting flight on the flight route at a starting point of the flight route (e.g., as defined for the UAV 105 by the aerial traffic management system 130). The starting point may be in an air corridor or outside of air corridors (e.g., at lower altitudes than any pre-defined air corridors). In some cases, the channel allocation instructions may be provided to the RAN 120 at flight start or prior to flight start.

At block 510, the aerial traffic management system 130 detects an event associated with at least a portion of the flight route of the UAV 105 during the flight of the UAV 105. The flight route may be adjusted due to detected dynamic condition/variable changes (also referred to as criticalities) associated with the corridor(s), such as cellular network congestion or outage, interference above a threshold associated with the cellular network, traffic congestion within and/or beneath the corridor(s), changes in atmospheric conditions, and/or generally other obstacles or changes in conditions not accountable for or not taken into consideration when the flight route was being generated.

In response to the detected event, at block 515, the aerial traffic management system 130 determines whether an alternative flight route is available. The aerial traffic management system 130 may determine whether portions of the airspace outside of the flight route may facilitate maintaining connectivity of the UAV 105 to the RAN 120. The determination may be based on interference associated with different portions (e.g., airspaces or portions thereof). The determination may be based on an interference index pattern and/or related statistics. For example, the aerial traffic management system 130 may reroute the UAV 105 to portions of the airspace for which no event has been detected. Whether an alternative flight route is available may also be based on the mission associated with the flight route of the UAV 105. For example, if the mission is to perform a test drive over the flight route and the detected event is a no fly zone (e.g., due to an accident), the mission may be aborted rather than rerouted since the mission itself was to obtain information about the flight route. In contrast, if the mission is to deliver a package to the destination point 145B, an alternative flight route may be available.

The aerial traffic management system 130 may adaptively adjust (e.g., reroute, update) the flight route and communicate the adjusted flight route in real time to the flying UAV. When an alternative flight route is determined to be available, at block 520, the aerial traffic management system 130 adjusts the current flight route utilized by the UAV 105 (e.g., the pre-programmed flight route or a previously adjusted flight route) based on an available flight route. An alternative flight route may be selected from among candidate flight routes based on the flight plan (e.g., mission) of the UAV 105 and characteristics (e.g., battery life, desired arrival time, etc.) for example. In an aspect, the aerial traffic management system 130 may reroute the UAV 105 to one or more different air corridors. The UAV 105 proceeds with its mission using the adjusted flight route until the mission is complete or a further adjustment to the flight route occurs.

When no alternative flight routes are available, at block 525, the aerial traffic management system 130 determines whether the event detected at block 510 is an interference event. When the event is not an interference event, at block 530, the aerial traffic management system 130 causes the mission to be aborted. For example, the aerial traffic management system 130 may transmit a message (e.g., NAS message) with an instruction to the UAV 105 to abort the mission. The message may identify the detected event and/or reasons for aborting the mission, such as to allow the user of the UAV 105 to better understand the situation and/or redefine the mission. In some cases, the message from the aerial traffic management system 130 may identify a location at which the UAV 105 can land or hover (e.g., in an air corridor). In this case, the aerial traffic management system 130 may indicate this location in a message to the user device 115. For example, when the UAV 105 is instructed to land at a particular location, the user can pick up the UAV 105 (e.g., and/or a package being delivered by the UAV 105 for delivery services) at the location. In some cases, the aerial traffic management system 130 and/or the UAV 105 may store information associated with the aborted mission, such as to allow analysis of the aborted mission and/or allow resuming of the aborted mission at a later time.

When the event is an interference event, at block 535, the aerial traffic management system 130 determines whether an alternative communication channel is available for connecting the UAV 105 to the RAN 120. The aerial traffic management system 130 may determine whether the UAV 105 may be migrated to a different radio channel to help maintain connectivity to the RAN 120. By way of non-limiting example, the aerial traffic management system 130 may determine whether the UAV 105 may be migrated to a radio channel of a different frequency band, lower bit rate (e.g., lower video bit rate), different type/category (e.g., migrate to 4G LTE-M from 4G LTE) associated with a communication technology (e.g., 4G), and/or different communication technology (e.g., UMTS). As an example, the aerial traffic management system 130 may migrate the UAV 105 from a 4G LTE-based communication channel to a 4G LTE-M-based communication channel.

At block 540, the aerial traffic management system 130 adjusts, during flight of the UAV 105, the channel allocation instructions based on an available alternative communication channel. At block 545, the aerial traffic management system 130 provides, during flight of the UAV 105, the adjust channel allocation instructions to the RAN 120.

As one example, the UAV 105 may be flying in a portion of the airspace associated with the detected event. In this case, the current base station receive the adjusted channel allocation instructions and may migrate the UAV 105 from a communication channel defined based on the channel allocation instructions provided at block 505 to a communication channel defined based on the adjusted channel allocation instructions. As another example, the UAV 105 is not yet at the portion of the airspace associated with the detected event. In this case, the aerial traffic management system 130 may determine whether the adjusted channel allocation instructions are to be used once the UAV 105 reaches the portion of the airspace or even prior to the UAV 105 reaching the portion of the airspace, and may provide the adjusted channel allocation instructions based on the determination. For a base station instructed by the aerial traffic management system 130 to assign the UAV 105 a communication channel based on the adjusted channel allocation instructions, the base station may assign a communication channel to the UAV 105 based on radio resource management of the base station 120A within bounds identified in the adjusted channel allocation instructions.

In an embodiment, the aerial traffic management system 130 may perform block 450 of FIG. 4 and block 540 of FIG. 5 if the UAV 105 is traversing or is expected to traverse portions of the airspace associated with the detected interference event at an altitude higher than a threshold altitude. In this regard, since the interference impact is an impact of or expected impact of UAVs due to accommodation of UAVs by the RAN 120, the aerial traffic management system 130 may set a threshold altitude. UAVs flying or otherwise operating below the threshold may be treated similarly to ground-based UEs. The aerial traffic management system 130 may set and adjust the threshold based on geographic information (e.g., amount of UAVs flying in the airspace, ground- and/or aerial-based cellular traffic, interference levels), time of day, day of year, holidays, etc. As examples, the threshold may be set to 50 ft, 200 ft, 300 ft, 400 ft, or any values in between. In some cases, although adjustments to the channel allocation instructions are not applied when UAVs are flying at altitudes below the threshold altitude, the aerial traffic management system 130 may still adjust the flight route based on changes in the geographic information at these lower altitudes.

It is noted that FIG. 5 provides an example process and that other processes may be utilized. In FIG. 5, the aerial traffic management system 130 attempts to reroute the UAV 105 over an alternative flight route when possible and determines whether the event is an interference event after the aerial traffic management system 130 determines that no alternative flight routes are available. In other embodiments, the aerial traffic management system 130 may determine whether to adjust the flight route, adjust the channel allocation instructions, or adjust the flight route and the channel allocation instructions. For example, when the mission of the UAV 105 is associated with low bandwidth applications or otherwise applications that can be readily adjusted to utilize fewer resources, the aerial traffic management system 130 may adjust the channel allocation instructions instead of the flight route, even when alternative flight routes are available.

Figure 6:
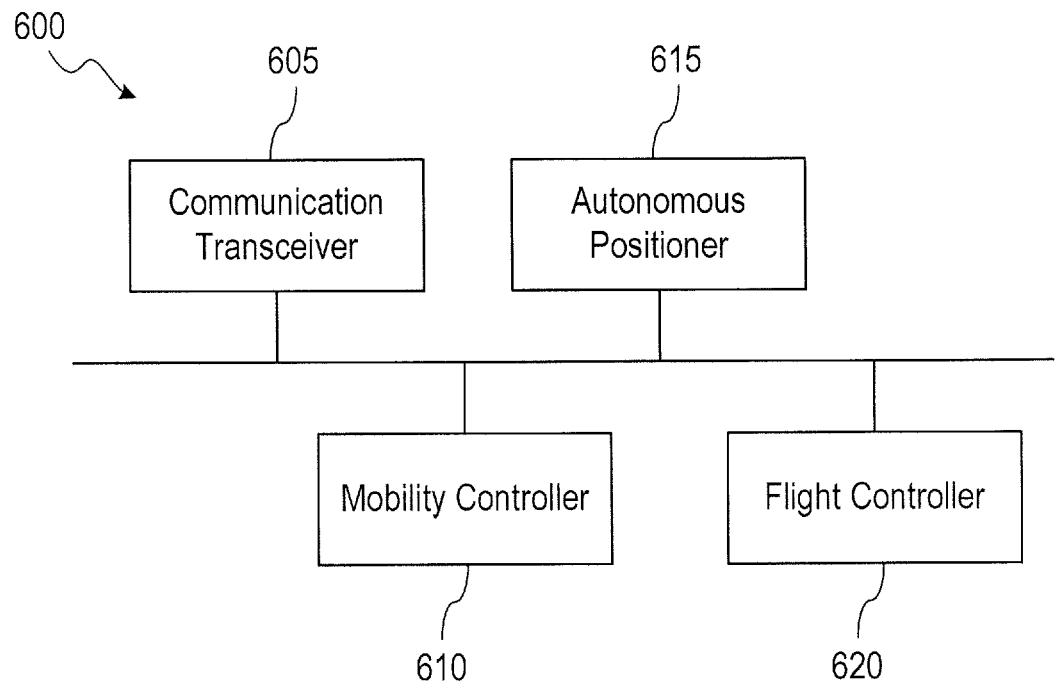
FIG. 6 illustrates a block diagram of an example of a UAV processing unit in accordance with one or more embodiments of the present disclosure.

FIG. 6 illustrates a block diagram of an example of a UAV processing unit 600 in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. For explanatory purposes, the UAV processing unit 600 is described herein with reference to the example network environment 100 of FIG. 1; however, the UAV processing unit 600 is not limited to the example network environment 100 of FIG. 1. In an aspect, the UAV 105 includes the UAV processing unit 600.

The UAV processing unit 600 may include a communication transceiver 605, a mobility controller 610, an autonomous positioner 615, a flight controller 620, and a flight rule controller 625. The communication transceiver 605 may implement appropriate physical layer(s) and protocol stack(s) to enable communication between the UAV 105 and the user device 115, base stations 120A-C, aerial traffic management system 130, and/or core network 135. For example, the communication transceiver 605 may include an LIE transceiver module for implementing an LTE physical layer and LTE protocol stack, and/or any other 3G, 4G, and/or 5G transceiver module(s), and/or satellite network transceiver module(s), and/or other transceiver module(s) associated with other wireless protocols/applications. The communication transceiver 605 may allow the UAV 105 to transmit messages to and/or receive messages from the user device 115, base stations 120A-C, aerial traffic management system 130, and/or core network 135 using the antenna 110 and/or other antenna. In some cases, data transmissions to and from the UAV 105 may occur over communication channels (e.g., physical communication channels) defined by a serving base station based on channel allocation instructions from the aerial traffic management system 130.

The mobility controller 610 may implement any control and feedback operations appropriate for interacting with the avionics, control actuators, and/or other equipment included in the flight control unit to fly the UAV 105, including, but not limited to, taking off, landing, and/or setting/adjusting direction, velocity, and/or acceleration of the UAV 105. In some cases, the mobility controller 610 may receive commands from the user device 115, base stations 120A-C, aerial traffic management system 130, and/or core network 135, to, for example, configure a flight route (e.g., program a flight route), adjust a programmed flight route, deploy the UAV 105, land the UAV 105, navigate the UAV 105, and/or other commands that facilitate navigating the UAV 105 and utilizing the UAV 105 to perform an action. In some cases, the mobility controller 610 may receive commands to move and/or rotate the UAV 105 and/or component thereof (e.g., the antenna 110).

The autonomous positioner 615 may be utilized to monitor (e.g., autonomously monitor) a current position of the UAV 105. The autonomous positioner 615 may include, or may be in communication with (e.g., via the communication transceiver 605), a GPS that provides the position of the UAV 105. In some cases, the autonomous positioner 615 may implement location determination techniques. In an aspect, the autonomous positioner 615 may determine a positional difference between the UAV 105 and a base station (e.g., the base station 120A) based on the position information of the UAV 105 and the base station. For example, the autonomous positioner 615 may generate signals (e.g., for the mobility controller 610) that cause rotation and/or movement of the antenna 110 (e.g., a directional antenna).

The flight controller 620 may be utilized to identify the current position of the UAV 105 (e.g., provided by the autonomous positioner 615) relative to positions in a pre-programmed flight route. The flight controller 620 may receive and process information from onboard sensors, base stations 120A-C, aerial traffic management system 130, core network 135, and/or other devices to determine whether to maintain the UAV 105 on the pre-programmed flight route or to deviate from the pre-programmed flight route (e.g., to avoid a collision). The flight controller 620 may generate control signals that cause the mobility controller 610 to fly the UAV 105 along a route specified by the control signals, which may or may not differ from the pre-programmed flight route, and/or control signals that cause movement and/or rotation of the UAV 105 and/or component thereof.

Figure 7:
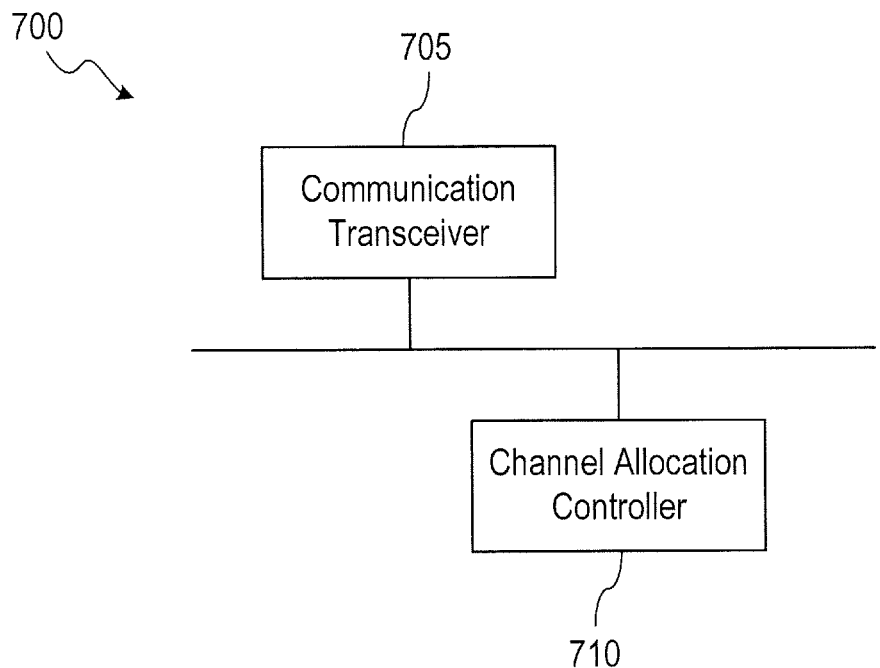
FIG. 7 illustrates a block diagram of an example of a communication channel allocation unit in accordance with one or more embodiments of the present disclosure.

FIG. 7 illustrates a block diagram of an example of a communication channel allocation unit 700 in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/ or fewer components may be provided. For explanatory purposes, the communication channel allocation unit 700 is described herein with reference to the base station 120A in the example network environment 100 of FIG. 1; however, the communication channel allocation unit 700 is not limited to the base station 120A or the example network environment 100 of FIG. 1.

The communication channel allocation unit 700 may include a communication transceiver 705 and a channel allocation controller 710. The communication transceiver 705 may implement appropriate physical layer(s) and protocol stack(s) to enable communication between the base station 120A and UEs (e.g., the UAV 105, the user device 115), other base stations of the RAN 120, aerial traffic management system 130, and/or core network 135. The communication transceiver 705 may relay messages between UEs, aerial traffic management system 130, and/or core network 135. In an embodiment, the communication transceiver 705 may receive channel allocation instructions associated with a UE from the aerial traffic management system 130. In some cases, data transmissions between the UAV 105 and the base station 120A may occur over communication channels (e.g., physical communication channels) defined by the channel allocation controller 710 based on channel allocation instructions from the aerial traffic management system 130.

The channel allocation controller 710 may assign a communication channel (e.g., physical communication channel) to a UE based on channel allocation instructions from the aerial traffic management system 130. The channel allocation instructions may indicate one or more of a frequency band allocatable to a UE, a bit rate allocatable to the UE, or a communication protocol for the UE. Within the boundaries set by the channel allocation instructions, the channel allocation controller 710 may assign a communication channel to the UE based on radio resource management of the base station 120A.

Figure 8:
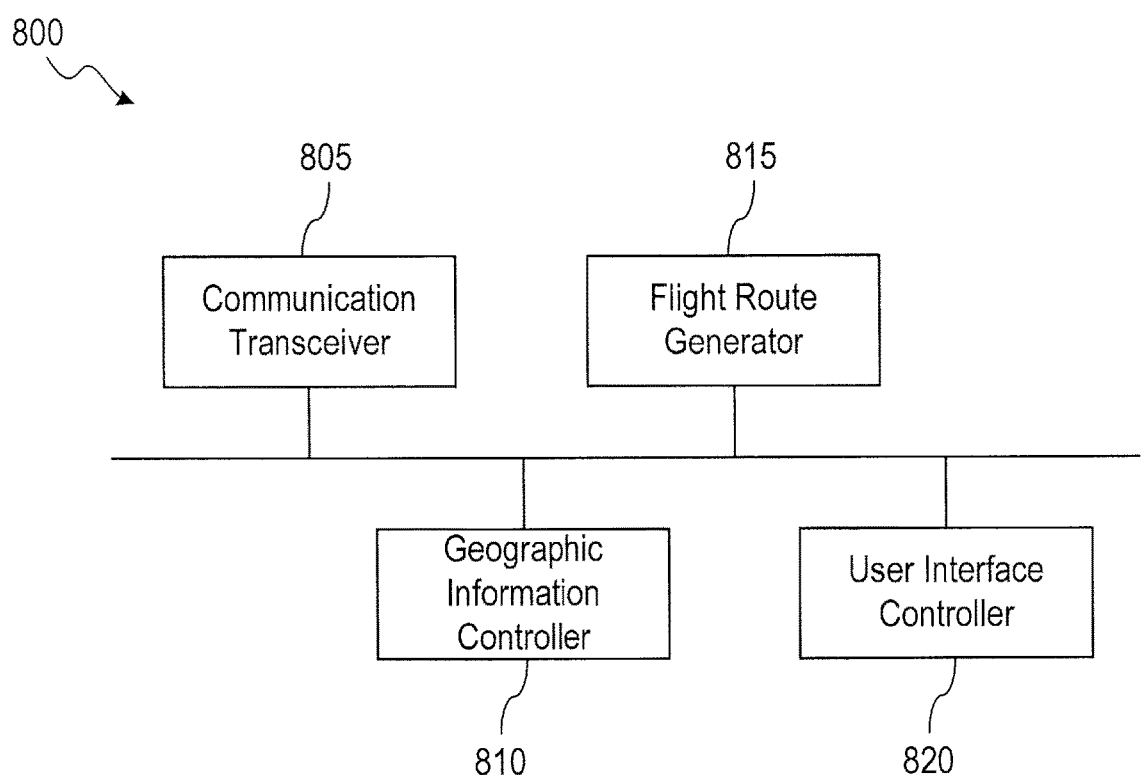
FIG. 8 illustrates a block diagram of an example of a flight management unit in accordance with one or more embodiments of the present disclosure.

FIG. 8 illustrates a block diagram of an example of a flight management unit 800 in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. For explanatory purposes, the flight management unit 800 is described herein with reference to the example network environment 100 of FIG. 1; however, the flight plan processing unit 800 is not limited to the example network environment 100 of FIG. 1. In an aspect, the aerial traffic management system 130 and/or the core network 135 may include the flight management unit 800, or components thereof.

The flight management unit 800 may include a communication transceiver 805, a geographic information controller 810, a flight route generator 815, and a user interface (UI) controller 820. The communication transceiver 805 may implement appropriate physical layer(s) and protocol stack(s) to enable communication between the aerial traffic management system 130 and/or core network 135 and the UAV 105. The communication transceiver 805 may allow the aerial traffic management system 130 and/or core network 135 to transmit messages (e.g., NAS messages) to and/or receive messages from the UAV 105 (e.g., directly or indirectly).

The geographic information controller 810 may be utilized to retrieve and process geographic information associated with a geographic region encompassing a starting point and a destination point provided by an operator. The geographic information may include obstacle information, weather information, emergency broadcast information, and/or other information, which may be retrieved from various sources.

The geographic information may also include traffic information, including air traffic information, from the base stations 120A-C and/or other base stations associated with the same mobile network operator, base stations of one or more other mobile network operator, and/or another party. For example, the traffic information may indicate utilization/occupancy associated with different base stations and interference impact (e.g., interference index pattern) associated with different portions of the airspace. In this regard, the geographic information controller 810 may generate control signals to be transmitted via the communication transceiver 805, and cause traffic information to be received via the communication transceiver 805. The geographic information may be utilized as is or may be processed into a form more readily usable for facilitating flight route generation. For example, the traffic information may be, or may be processed to obtain, traffic statistics.

The flight route generator 815 may be utilized to generate flight routes and channel allocation instructions for connecting to the cellular network during flight of UAVs on associated flight routes. The flight routes and channel allocation instructions may be generated based on geographic information of the geographic region encompassing the starting point and the destination point and/or information from an operator. The flight route generator 815 may receive signals from the geographic information controller 810. The flight route generator 815 may also adjust previously generated flight routes and/or channel allocation instructions based on detected events (e.g., changes to the geographic information) or the operator's flight plan. In an embodiment, the flight route generator 815 may generate flight routes by connecting one or more predefined air corridors. The flight route generator 815 may store, or may have access to, information pertaining to flight routes currently being effectuated by various UAVs, flight routes that have been completed in the past, and flight routes to be initiated in the future.

The UI controller 820 may be utilized to provide an interface for facilitating providing of user input to generate and manage flight plans. For example, the UI controller 820 may provide a user interface on a website and/or an application program that accepts user input from an operator. By way of non-limiting example, the user interface may allow the operator to provide information that may be utilized by the flight route generator 815 to generate flight plans and/or adjust existing flight plans.

While an example manner of implementing the UAV processing unit 600, communication channel allocation unit 700, and flight management unit 800 are illustrated in FIGS. 6, 7, and 8, respectively, one or more of the components (e.g., elements, processes, and/or devices) illustrated in FIGS. 6, 7, and 8 may be combined, divided, re-arranged, omitted, eliminated, and/or implemented in any other way. Further, the various components (e.g., 605, 610, 615, 620, 705, 710, 805, 810, 815, 820) may be implemented by hardware, software, firmware, and/or any combination of hardware, software, and/or firmware. Thus, for example, any of these components, and/or, more generally, the UAV processing unit 600, communication channel allocation unit 700, and flight management unit 800 may be implemented by one or more analog and/or digital circuits, logic circuits, programmable processors, application specific integrated circuits (ASICs), programmable logic devices (PLDs), and/or field programmable logic devices (FPLDs). In this regard, when implemented using circuitry, the UAV processing unit 600, communication channel allocation unit 700, and flight management unit 800 may be referred to as UAV processing circuit, communication channel allocation circuit, and flight management circuit, respectively.

When reading any claims as set forth herein to cover purely software and/or firmware implementations, at least one of the units or components in FIGS. 6, 7, and 8 is hereby expressly defined to include a tangible computer readable storage device or storage disk such as a memory, digital versatile disk (DVD), compact disk (CD), a Blu-ray disc™, and/or other storage device/disk storing the software and/or firmware.

Figure 9:
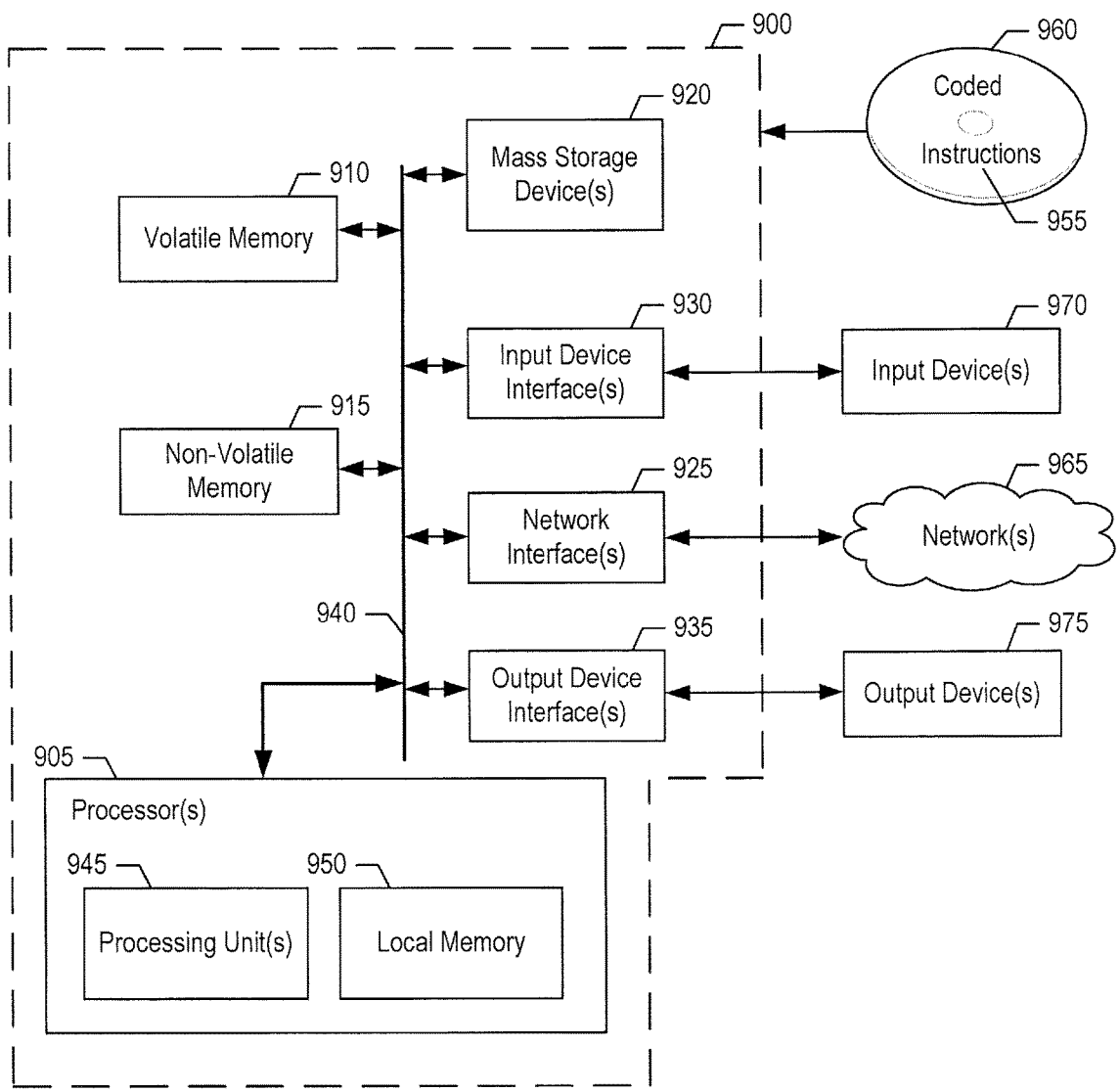
FIG. 9 illustrates a block diagram of an example of an electronic system with which one or more embodiments of the present disclosure may be implemented.

FIG. 9 illustrates a block diagram of an example of an electronic system 900 with which one or more embodiments of the present disclosure may be implemented. In an embodiment, the electronic system 900 may be, may include, or may be referred to as, processor platform. The electronic system 900 can generally be any type of computing device. In an embodiment, the electronic system 900 can be, can include, and/or can be a part of, one or more of the UAV 105, user device 115, base stations 120A-C, aerial traffic management system 130, core network 135 (e.g., MME of the core network 135) shown in FIG. 1. For example, the electronic system 900 may be, may include, or may be a part of, the UAV 105.

The electronic system 900 includes one or more processors 905, volatile memory 910, non-volatile memory 915, one or more mass storage devices 920, one or more network interfaces 925, one or more input device interfaces 930, one or more output device interfaces 935, and a link 940. The link 940 may be, may include, or may be implemented by, a bus, one or more point-to-point connections (e.g., intra-chip connections and/or inter-chip connections), and/or other connections for facilitating connection of and/or communication between various components of the electronic system 900.

The link 940 couples (e.g., connects) to the processor(s) 905. In an aspect, the processor(s) 905 of the illustrated example is hardware. For example, the processor(s) 905 can be implemented by one or more integrated circuits, logic circuits, processors, and/or controllers from any desired family or manufacturer. The processor(s) 905 includes one or more processing units 945 configured via instructions 955 stored in a local memory 950 (e.g., a cache) of the processor(s) 905. In an aspect, the instructions 955 may include instructions that when executed, perform at least some instructions of FIGS. 4 and 5 and/or to implement the one or more of the units 600, 700, and 800 of FIGS. 6, 7, and 8. The processor(s) 905 is in communication with the volatile memory 910, non-volatile memory 915, and the mass storage device(s) 920 via the link 940. In an aspect, the processor(s) 905 may be, may include, or may be a part of, the UAV processing unit 600 of FIG. 6, communication channel allocation unit 700 of FIG. 7, or the flight management unit 800 of FIG. 8. In an aspect, the processing units 945 may be, may include, or may be a part of, the UAV processing unit 600 of FIG. 6, communication channel allocation unit 700 of FIG. 7, or the flight management unit 800 of FIG. 8.

The link 940 couples (e.g., connects) to the volatile memory 910, non-volatile memory 915, and mass storage device(s) 920. The volatile memory 910 may include synchronous dynamic random access memory (SDRAM), dynamic RAM (DRAM), static RAM (SRAM) Rambus dynamic RAM (RDRAM), and/or other types of volatile memory. The non-volatile memory 915 may include read-only memory (ROM), programmable ROM (PROM), erasable programmable ROM (EPROM), electrically erasable programmable (EEPROM), flash memory, non-volatile RAM (NVRAM), and/or other types of non-volatile memory. The non-volatile memory 915 may store instructions and data even when the electronic system 900 is off. The mass storage device(s) 920 may include floppy disk drives, hard disk drives, compact disk drives, DVD drives, Blu-ray disc™ drives, redundant array of independent disks (RAID) systems, solid state memories, and/or other devices that allow storage. Access to the volatile memory 910, non-volatile memory 915, and mass storage device(s) 920 may be controlled by a memory controller (not shown). In an aspect, the coded instructions 955 corresponding to at least some instructions of FIGS. 4 and/or 5 may be stored in the volatile memory 910, non-volatile memory 915, mass storage device(s) 920, local memory 950, and/or on a removable tangible computer readable storage medium, such as a disk 960 (e.g., CD, DVD, or Blu-ray disc™).

The link 940 couples (e.g., connects) to the network interface(s) 925. The network interface(s) 925 may couple the electronic system 900 to one or more networks 965. In this manner, the electronic system 900 can be a part of a network of devices, such as a local area network (LAN), a WAN, or an Intranet, or a network of networks, such as the Internet. In an embodiment, the network interface(s) 925 may facilitate communication between the electronic system 900 and a cellular network, such as a cellular network that includes the RAN 120, aerial traffic management system 130, and/or core network 135 of FIG. 1. In this regard, the network interface(s) 925 may also facilitate communication between the electronic system 900 and the user device 115. The network interface(s) 925 may be implemented by any type of interface standard, such as an Ethernet interface, a universal serial bus (USB) interface, a PCI express interface, a wireless network interface (e.g., wireless LAN interface), a cellular network interface, and/or other interfaces. For example, a cellular network interface may provide support for Global System for Mobile Communications (GSM)-based cellular networks, code division multiple access (CDMA)-based cellular networks, and/or other cellular networks. The network interface(s) 925 may include a communication device such as a transmitter, receiver, transceiver, modem, and/or network interface card to facilitate exchange of data with external machines (e.g., computing devices of any kind) via the network(s) 965. In an aspect, the network interface(s) 925 may be structured to implement the communication transceiver 605, 705, or 805 of FIG. 6, 7, or 8.

The link 940 couples (e.g., connects) to the input device interface(s) 930. The input device interface(s) 930 may couple the electronic system 900 to one or more input devices 970. The input device(s) 970 may enable a user to provide (e.g., enter) data and commands to the electronic system 900. For example, the user may be an operator of the UAV 105 when the electronic system 900 is disposed on the UAV 105 or when the electronic system 900 is a remote control device (e.g., the user device 115) of the UAV 105. The input device(s) 970 may include, for example, an audio sensor, a microphone, a camera (still or video), a voice recognition system, a keyboard (e.g., a physical or virtual keyboard), a cursor control device (e.g., a mouse), a touch-screen, and/or other devices for providing user input to the electronic system 900. Also, many systems, such as the electronic system 900, can allow a user to provide data and commands using physical gestures, such as, but not limited to, hand or body movements, facial expressions, and face recognition. In this regard, the user input may be received in any form, such as audio (e.g., speech), visual, and/or tactile. For example, in an aspect, to adjust a flight path of a UAV (e.g., the UAV 105) that is, includes, or is a part of the electronic system 900, the user may enter text via a physical keyboard communicatively connected to the electronic system 900 via the input device interface(s) 930. The text input may be relayed to the processor(s) 905 via the input device interface(s) 930 and the link 940. The processor(s) 905 may process the text input into commands to adjust the flight path of the UAV and facilitate implementation of the commands.

The link 940 couples (e.g., connects) to the output device interface(s) 935. The output device interface(s) 935 may couple the electronic system 900 to one or more output devices 975. The output device interface(s) 935 may include a graphics and/or audio driver card, graphics and/or audio driver chip, and/or graphics and/or audio driver processor. The output device(s) 975 may enable the electronic system 900 to provide output information to a user. The output device(s) 975 may include, for example, display devices (e.g., a light emitting diode (LED), an organic LED (OLED), a liquid crystal display (LCD)), audio devices (e.g., speakers), audiovisual devices, and/or other output devices. In this regard, the output information may provide feedback to the user in any form, such as visual feedback, auditory feedback, and/or tactile feedback. For example, in an aspect, a UAV (e.g., the UAV 105) that is, includes, or is a part of the electronic system 900 may provide operational characteristics, such as remaining battery power, remaining fuel level, remaining actions to be performed, current position in a flight path, component health (e.g., engine health, battery health), to a display coupled to the UAV (e.g., wired or wirelessly coupled) via the output device interface(s) 935 and viewable by the user.

In one or more embodiments, FIGS. 4 and 5 illustrate example machine readable instructions for the UAV processing unit 600 and/or components thereof, communication channel allocation unit 700 and/or components thereof, and/or the flight management unit 800 and/or components thereof. In these examples, the machine readable instructions may include one or more programs for execution by one or more processors, such as the processor(s) 905 shown in the electronic system 900. The one or more programs, or portion(s) thereof, may be embodied in software stored on a tangible computer readable storage medium, such as a CD-ROM, a floppy disk, a hard drive, a DVD, a Blu-ray disc™, and/or a memory associated with the processor(s) 905, but the entire program or programs and/or portions thereof may alternatively be executed by a device other than the processor(s) 905, and/or embodied in firmware or dedicated hardware (e.g., implemented by an ASIC, a PLD, an FPLD, discrete logic, etc.). Further, although the example program(s) is described with reference to the flow diagrams illustrated in FIGS. 4 and 5, many other methods may be used. For example, with reference to the flow diagrams illustrated in FIGS. 4 and 5, the order of execution of the blocks may be changed, and/or some of the blocks described may be changed, removed, combined, and/or subdivided into multiple blocks.

The example processes 400 and 500 of FIGS. 4 and 5, respectively, may be implemented using coded instructions (e.g., computer and/or machine readable instructions) stored on a tangible computer readable storage medium such as a hard disk drive, flash memory, ROM, RAM, CD, DVD, cache and/or any other storage device or storage disk in which information is stored for any duration (e.g., for extended time periods, permanently, for brief instances, for temporarily buffering, and/or for caching of the information). Alternatively or in addition, the example processes 400 and 500 of FIGS. 4 and 5, respectively, may be implemented using coded instructions (e.g., computer and/or machine readable instructions) stored on a non-transitory computer and/or machine readable medium such as a hard disk drive, flash memory, ROM, RAM, CD, DVD, cache and/or any other storage device or storage disk in which information is stored for any duration (e.g., for extended time periods, permanently, for brief instances, for temporarily buffering, and/or for caching of the information). As used herein, the terms "tangible computer readable storage medium" and "non-transitory computer readable medium" are expressly defined to include any type of computer readable storage device and/or storage disk and to exclude propagating signals and to exclude transmission media. As used herein, "tangible computer readable storage medium" and "tangible machine readable storage medium" are used interchangeably.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of the present disclosure is not limited to such standards and protocols. For instance, each of the standards for Internet and other packet switched network transmission (e.g., Transmission Control Protocol (TCP)/Internet Protocol (IP), User Datagram Protocol (UDP)/IP, Hypertext Markup Language (HTML), Hypertext Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by the present disclosure and are intended to be included within the scope of the accompanying claims.

Additionally, although embodiments of the present disclosure provide example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the foregoing provides example systems, methods, and articles of manufacture, the examples are not the only way to implement such systems, methods, and articles of manufacture. Therefore, although certain example methods, apparatus, and articles of manufacture have been described herein, the scope of coverage of the present disclosure is not limited thereto. On the contrary, the present disclosure covers all methods, apparatus, and articles of manufacture fairly falling within the scope of the claims either literally or under the doctrine of equivalents.

What is claimed is:

1. A method to facilitate network connectivity of an unmanned aerial vehicle, the method comprising:
    providing, to at least one access point of a radio access network during a flight of the unmanned aerial vehicle on a flight route, channel allocation instructions for connecting the unmanned aerial vehicle to the radio access network via a communication channel;
    detecting an interference event associated with a portion of the flight route of the unmanned aerial vehicle during the flight;
    adjusting, during the flight, the channel allocation instructions to generate adjusted channel allocation instructions in response to the detecting the interference event; and
    providing the adjusted channel allocation instructions to at least one access point of the radio access network during the flight, wherein the adjusted channel allocation instructions comprise an instruction to migrate the unmanned aerial vehicle from the radio access network to a network of a different communication technology than the radio access network.

2. The method of claim 1, wherein the adjusting the channel allocation instructions comprises adjusting a bit rate allocatable to the unmanned aerial vehicle.

3. The method of claim 1, wherein the interference event comprises an interference above a threshold value for the portion of the flight route.

4. The method of claim 1, wherein the adjusted channel allocation instructions are for connecting the unmanned aerial vehicle during the flight on at least the portion of the flight route.

5. The method of claim 1, further comprising:
    determining whether to adjust the flight route of the unmanned aerial vehicle based at least on the interference event that is detected and interference information associated with a volumetric space outside of the flight route; and
    adjusting the flight route when the determination is to adjust the flight route,
    wherein the adjusting the channel allocation instructions is performed when the determination is to not adjust the flight route.

6. The method of claim 5, wherein the adjusting the flight route comprises rerouting the unmanned aerial vehicle from flight on a first predefined air corridor within the flight route to flight on a second predefined air corridor.

7. The method of claim 1, further comprising:
    receiving authentication information from the unmanned aerial vehicle, wherein the authentication information comprises an indication of the unmanned aerial vehicle being an aerial-based device;
    authenticating the unmanned aerial vehicle to the radio access network; and
    transmitting the flight route to the unmanned aerial vehicle based at least on the authenticating.

8. The method of claim 7, further comprising:
    receiving flight plan information comprising a starting point, a destination point, and one or more actions associated with the flight on the flight route; and
    generating the flight route based at least on the flight plan information that is received in response to successful authentication,
    wherein the channel allocation instructions are based at least on the one or more actions associated with the flight on the flight route.

9. The method of claim 1, further comprising:
    determining one or more interference indices for each of a plurality of predefined air corridors based at least on interference information associated with each of the plurality of predefined air corridors,
    wherein the flight route is generated based on the plurality of predefined air corridors and the one or more interference indices associated with each of the plurality of predefined air corridors.

10. The method of claim 1, further comprising determining an interference index based on interference information associated with the portion of the flight route, wherein the detecting the interference event is based on the interference index, and wherein the flight route is generated based at least on the interference index.

11. The method of claim 1, wherein the detecting the interference event comprises:
    detecting an event associated with the portion of the flight route; and
    determining that the event is the interference event based at least on an action associated with the unmanned aerial vehicle during the flight on the flight route.

12. A system, comprising:
    one or more processors; and
    a non-transitory machine readable medium comprising instructions stored therein, which when executed by the one or more processors, cause the one or more processors to perform operations, the operations comprising:
        receiving flight plan information comprising a first point and a second point;
        generating, based at least on the flight plan information and interference information associated with a geographic region encompassing the first point and the second point, a flight route for an unmanned aerial vehicle and channel allocation instructions for connecting the unmanned aerial vehicle to a radio access network via a communication channel;
        providing the flight route to the unmanned aerial vehicle;
        providing, to at least one access point of the radio access network during a flight of the unmanned aerial vehicle on the flight route, the channel allocation instructions;
        adjusting, during the flight, the channel allocation instructions to generate adjusted channel allocation instructions in response to a first event associated with a first portion of the flight route; and
        providing the adjusted channel allocation instructions to at least one access point of the radio access network during the flight.

13. The system of claim 12, wherein the adjusting the channel allocation instructions comprises adjusting at least one of a frequency band allocatable to the unmanned aerial vehicle, a bit rate allocatable to the unmanned aerial vehicle, or a communication protocol for the unmanned aerial vehicle.

14. The system of claim 12, wherein the first event comprises an interference above a threshold value for the first portion of the flight route.

15. The system of claim 12, wherein the operations further comprise:
    detecting a second event associated with a second portion of the flight route;

adjusting, based at least on the second event that is detected and the interference information, the flight route of the unmanned aerial vehicle from flight on a first predefined air corridor within the flight route to flight on a second predefined air corridor; and providing the flight route that is adjusted to the unmanned aerial vehicle.

16. The system of claim 12, wherein the operations further comprise:

receiving authentication information associated with the unmanned aerial vehicle, wherein the authentication information comprises an indication of the unmanned aerial vehicle being an aerial-based device.

17. The system of claim 12, wherein the geographic region encompasses a plurality of predefined air corridors, wherein the operations further comprise:

associating one or more interference indices with each of the plurality of predefined air corridors based at least on the interference information, wherein the flight route is generated based further on the plurality of predefined air corridors and the one or more interference indices associated with each of the plurality of predefined air corridors.

18. A non-transitory machine readable storage medium including machine readable instructions which, when executed, cause one or more processors of a device to perform operations, the operations comprising:

determining one or more interference indices for each of a plurality of predefined air corridors based at least on interference information associated with the plurality of predefined air corridors;

providing, to at least one access point of a radio access network, channel allocation instructions for connecting unmanned aerial vehicles to the radio access network via a communication channel during a flight of the unmanned aerial vehicles on a flight route, wherein the flight route comprises a subset of the plurality of predefined air corridors, wherein the flight route is generated based at least on the plurality of predefined air corridors and the one or more interference indices associated with each of the plurality of predefined air corridors;

detecting an interference event associated with at least one of the subset of the plurality of predefined air corridors;

determining whether an alternative flight route is available based at least on the interference information associated with the plurality of predefined air corridors;

adjusting the channel allocation instructions to generate adjusted channel allocation instructions in response to the detecting the interference event when no alternative flight routes are determined to be available; and providing the adjusted channel allocation instructions to at least one access point of the radio access network.

19. The non-transitory machine readable storage medium of claim 18, wherein the adjusting the channel allocation instructions comprises adjusting at least one of a frequency band allocatable to one of the unmanned aerial vehicles, a bit rate allocatable to the one of the unmanned aerial vehicles, or a communication protocol for the one of the unmanned aerial vehicles.

20. The non-transitory machine readable storage medium of claim 18, wherein the operations further comprise:

receiving flight plan information comprising a starting point, a destination point, and one or more actions associated with the flight on the flight route, wherein:
the flight route is based at least on the starting point and the destination point, and
the channel allocation instructions are based at least on the one or more actions associated with the flight on the flight route.

* * * * *